United States Patent Office 3,801,573
Patented Apr. 2, 1974

3,801,573
SUBSTITUTED AMINOSPIROTHIAZINES
Noal Cohen, Montclair, N.J., assignor to Hoffmann-La Roche Inc., Nutley, N.J.
No Drawing. Filed Aug. 24, 1971, Ser. No. 174,512
Int. Cl. C07d 93/06
U.S. Cl. 260—243 R     24 Claims

ABSTRACT OF THE DISCLOSURE 1,3-thiazines containing a substituted amino group at the 2-position and a spiro oxygenated heterocyclic ring are useful as analgesic, anti-inflammatory and antipyretic agents.

BRIEF DESCRIPTION OF THE INVENTION

The present invention relates to novel spirothiazine compounds of the formula

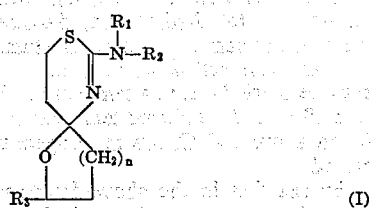

(I)

wherein $R_1$ taken independently is hydrogen, lower alkyl, lower alkenyl, aryl lower alkyl, aryl, lower alkanoyl or benzoyl; $R_2$ taken independently is hydrogen, lower alkyl, lower alkenyl, aryl, aryl lower alkyl, or a group of the formula

where $R_4$ is lower alkyl, phenyl, substituted phenyl, heteroaryl, naphthyl, cycloalkyl, substituted cycloalkyl, aryl lower alkyl, styryl or one of the groups $$-(CH_2)_m-R_5$$

and $-NH-R_6$ where $R_5$ is lower alkoxy or lower alkoxycarbonyl, $R_6$ is lower alkyl or phenyl and $m$ is an integer of from one to six with the proviso that $R_1$ and $R_2$ are not both hydrogen; $R_1$ and $R_2$ taken together are a group of one of the formulas

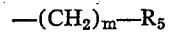

where Y is a lower alkylene group of from one to three carbons or an ortho arylene residue; $R_3$ is hydrogen, lower alkyl, phenyl, 3,5-di(lower alkyl)-isoxazol-4-yl ethyl, 4,4-lower alkylenedioxy- or arylenedioxy-1-pentyl or 3-cyanopropyl; $n$ is an integer of from 1 to 3; and the tautomers, enantiomers and acid addition salts thereof.

The compounds of Formula I may exist in various tautomeric forms when $R_1$ or $R_2$ is hydrogen, depending upon the nature of $R_1$ and $R_2$, whether the compound is in the crystalline state or in solution, the nature of the solvent, the temperature, and so forth. A number of the possible tautomeric forms of compounds illustrated where $R_1$ is hydrogen and $R_2$ is

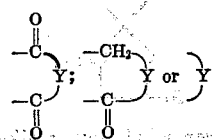

are shown below, but for clarity of treatment and to avoid confusion, all compounds of Formula I will be depicted hereinafter in tautomeric form i (i.e., endocyclic double bond, and where appropriate, non-enolized amide) and all compounds, both in the specification and the claims will be named accordingly.

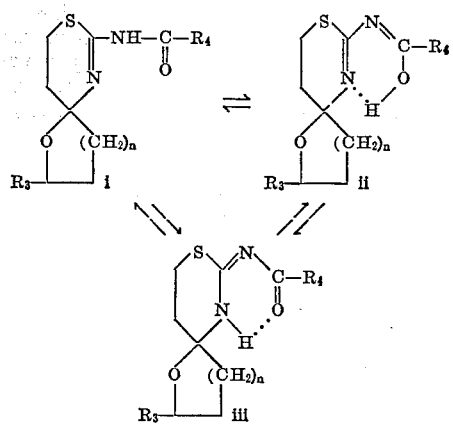

As used throughout the specification and the appended claims, the term "alkyl group" shall mean a straight or branched chain hydrocarbon group containing no unsaturation and having up to 20 carbon atoms such as methyl, ethyl, hexyl, isopropyl, tert.-butyl, decyl, etc.; the term "cycloalkyl group" shall mean a saturated hydrocarbon group possessing at least one carbocyclic ring, said ring containing from 3 to 8 carbon atoms. Examples of cycloalkyl groups are cyclopropyl, cyclopentyl, cyclohexyl, cyclooctyl, 1-adamantyl and so forth. The term "alkenyl group" shall mean a straight or branched chain hydrocarbon group having olefinic unsaturation and having up to 20 carbon atoms such as vinyl, isopropenyl, 2-butenyl, 2-hexenyl, etc. The term "aryl group" shall mean a monocyclic or bicyclic hydrocarbon group containing aromatic unsaturation having a free valence bond from an aromatic ring. Examples of aryl groups are phenyl, 2-naphthyl, p-tolyl, p-fluorophenyl, m-methoxyphenyl, etc. The term "alkoxy group" includes groups up to 20 atoms formed by removing the hydrogen from the hydroxyl group of a straight or branched chain alkanol. Examples of alkoxy groups include methoxy, ethoxy, propoxy, butoxy and so forth. The term "alkanoyl" comprehends the residue formed by removing the hydroxyl portion from the carboxyl moiety of an alkanoic acid having up to 20 carbon atoms. Examples of alkanoyl groups are formyl, acetyl, propionyl, pivaloyl, hexanoyl, and so forth. The term "alkylene group" comprehends a straight chain hydrocarbon group containing no unsaturation and having up to 20 carbon atoms with one free valence bond at each terminal carbon atoms; the term "ortho arylene group" comprehends a group containing an aromatic ring which has two free valence bonds from adjacent carbons of the aromatic ring. The term "lower" as applied to any of the foregoing groups denotes a group having a carbon skeleton containing up to and including 8 carbon atoms. Examples of aryl lower alkyl groups are benzyl, 2-phenylethyl, 1-phenylethyl, p-methylbenzyl, p-nitrobenzyl and so forth. The term "substituted" as applied to a phenyl group means phenyl substituted with one or more of the following radicals: lower alkyl, trifluoromethyl, phenyl, halogen (i.e., fluorine, chlorine, bromine, or iodine), nitro, cyano, lower alkoxy hydroxy, amino, lower alkylamino or di-(lower alkyl)amino. The term "heteroaryl group" comprehends monocyclic or bicyclic groups having an aromatic ring containing at least one ring hetero atom. Examples of heteroaryl groups are furyl, thienyl, pyridyl, indolyl, pyrrolyl, pyrazinyl, pyrimidinyl, quinolyl, isoxazolyl, and so forth. The term "substituted cycloalkyl group" means cycloalkyl substituted with one or more lower alkyl or phenyl groups.

Preferred compounds of Formula I are those wherein $R_1$ is hydrogen and $R_2$ is a group of the formula

where $R_4$ is phenyl, substituted phenyl or styryl, or those where $R_1$ and $R_2$ taken together are phthaloyl; $n$ is 2 and $R_3$ is hydrogen. Especially preferred are compounds where $R_4$ is phenyl mono-substituted in the meta or para position.

The compounds of Formula I can, in most instances, be prepared from the corresponding amine of Formula II

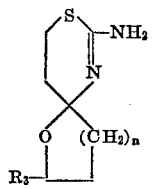

where $R_3$ and $n$ are as above.

For example, compounds of Formula Ia

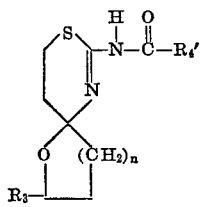

where $R_4'$ is lower alkyl, phenyl, substituted phenyl, cycloalkyl, substituted, cycloalkyl, naphthyl, heteroaryl, aryl lower alkyl, styryl or the group $-(CH_2)_m-R_5$ where $R_5$ is lower alkoxy or lower alkoxycarbonyl, and $R_3$, $m$ and $n$ are as above, can be prepared by reacting the amine of Formula II with an acylating agent in the presence of a base. Suitable acylating agents are, for example, acyl halides, e.g., acetyl chloride, benzoyl chloride, p-fluorobenzoyl chloride, etc.; acyl anhydrides, e.g. acetic anhydride, propionic anhydride, etc.; acyl imidazoles; acyl esters, e.g., tosylates, mesylates, p-nitrobenzoates, etc. Preferred acylating agents are acyl halides and acyl imidazoles. Suitable bases include alkali metal hydroxides, e.g. sodium hydroxide; and organic amines, e.g. pyridine, triethylamine, etc. Preferred bases are organic amines, especially pyridine. No additional amine is necessary when an acyl imidazole is employed as the acylating agent. The reaction may be conducted in any suitable inert organic solvent such as hydrocarbons, e.g. benzene, toluene, hexane, etc.; ethers, e.g. diethyl ether, tetrahydrofuran, etc.; or an excess of the amine employed in the reaction. The acylation reaction may be conducted over a broad temperature range from about $-20°$ to the boiling point of the reaction medium. It is generally preferred to conduct the acylation reaction between 20° and 50°, most preferably at about room temperature. Compounds of Formula Ib

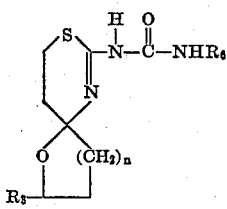

where $R_3$, $R_6$ and $n$ are as above, may be prepared from compounds of Formula II by reaction with a lower alkyl isocyanate, e.g., methylisocyanate; or phenylisocyanate, in an inert organic solvent. Suitable solvents include hydrocarbons, e.g. benzene, toluene, hexane, etc.; chlorinated hydrocarbons, e.g., methylene chloride, chloroform, etc.; ethers, e.g. diethylether, tetrahydrofuran, dioxane, etc.; esters, e.g. ethyl acetate; amides, e.g. dimethylformamide; and so forth. The temperature is not critical and may range from 0° to about 100° C. A preferred temperature range is from about 20° to about 50° C., with a temperature of about room temperature being especially preferred.

Compounds of Formula Ia may be alkylated or acylated by reaction with an alkylating agent or acylating agent, respectively, in the presence of a strong base. Examples of alkylating agents suitable for the present reaction are lower alkyl, lower alkenyl or aryl lower alkyl halides, e.g., methyl iodide, ethyl iodide, benzyl chloride, etc.; lower alkyl, lower alkenyl or aryl lower alkyl sulfonyl esters, such as tosylates or mesylates. Suitable acylating agents are the same as those described above for the introduction of the

group. Strong bases that are suitable for the present reaction include alkali metal hydrides, e.g. sodium hydride; alkali metal amides, e.g. sodium amide; alkali metal alkoxides, e.g. sodium methoxide; and so forth.

Suitable solvents which may be employed in the reaction include hydrocarbons, e.g. benzene, toluene, etc.; ethers, e.g. tetrahydrofuran, dioxane, etc.; amides, e.g. dimethylformamide, dimethylacetamide, etc.; sulfoxides, e.g. dimethyl sulfoxide, etc.; and so forth. The reaction may be carried out at a temperature between about $-20°$ and 100° C. A preferred temperature range is from about 0° to about 50° C. Room temperature is especially preferred.

By reaction in the above-described manner, there are formed compounds of Formula Ic

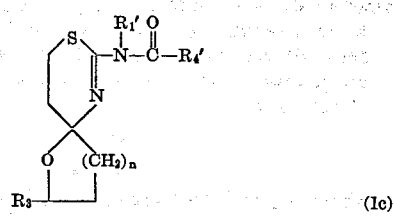

where $R_1'$ is lower alkyl, lower alkenyl, aryl lower alkyl, lower alkanoyl or benzoyl and $R_3$, $R_4'$ and $n$ are as above.

If it desired to form compounds of the formula

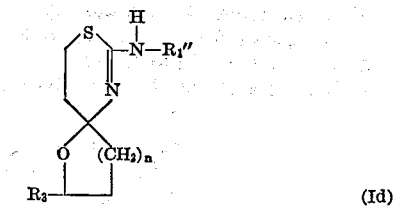

where $R_1''$ is lower alkyl, lower alkenyl, aryl or aryl lower alkyl and $R_3$ and $n$ are as above, such compounds may be prepared either by removing the acyl group from the nitrogen atom of the appropriate compound of Formula Ic or, where $R_1''$ is aryl, according to the procedure described below for the preparation of compounds of Formula Ie.

For the deacylation, it is preferred to utilize a compound of Formula Ic having an easily removal acyl group on the nitrogen such as, for example, formyl or acetyl. Removal of the acyl group can be effected, for example, by treatment with aqueous acid or aqueous base. Suitable acids include mineral acids, e.g. hydrochloric acid, sulfuric acid, etc.; organic sulfonic acids, e.g. p-toluenesulfuric acid; and so forth. Suitable bases include alkali metal hydroxides, e.g. sodium hydroxide or potassium hydroxide. The reaction may be conducted in the aqueous acidic or basic medium, with or without a co-solvent. Suitable co-solvents include alcohols, e.g. methanol or ethanol; miscible organic ethers, e.g. tetrahydrofuran, dioxane; and so forth. The reaction temperature may range from about room temperature to the boiling point of the reaction medium. It is preferred to employ a temperature in the range of from 50° to 120° C.

In one aspect of the present invention, the compounds of Formula II may be prepared by a novel procedure involving condensation of a hydroxy vinyl ketone of the formula

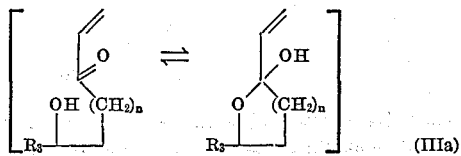

or its addition product of the formula

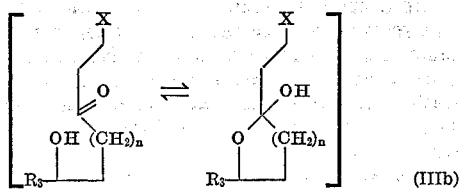

where X is halogen selected from the group consisting of chlorine, bromine or iodine or a group of the formula

where $R_7$ and $R_8$ are each independently lower alkyl or taken together are lower alkylene of from four to six carbon atoms, and $R_3$ and $n$ are as above, with thiourea. Suitable solvents include lower alkanoic acids, e.g. acetic acid; and aprotic organic solvents, e.g. acetonitrile, dimethylformamide, tetrahydrofuran, etc. The reaction may be carried out using a temperature in the range of from below room temperature to the boiling point of the reaction medium; however, a reaction temperature of about room temperature is generally preferred. In a preferred embodiment, when X is

the condensation reaction is carried out using lower alkanoic acid as the reaction solvent. Especially preferred is acetic acid. The resulting thiazine of Formula II may be isolated either as the free base or as a suitable acid addition salt. Where $R_3$ is other than hydrogen, the resulting product usually is isolated as a mixture of isomers, which may be separated by crystallization, chromatography or other standard techniques, either as the free base or as the acid addition salt; or the mixture may be converted to a mixture of derivatives of, for example, Formula I which may then be separated.

Compounds of Formulae IIIa and IIIb where $n$ is 2 and $R_3$ is hydrogen, lower alkyl, 3,5-di(lower alkyl)-isoxazol-4-yl-ethyl, 4,4-lower alkylenedioxy- or arylenedioxy-1-pentyl are known in the art. The compounds where $R_3$ is phenyl are prepared in an analogous manner to those where $R_3$ is lower alkyl, starting with δ-phenyl-δ-valerolactone. The preparation of compounds of Formula IIIa and IIIb where $R_3$ is 3-cyanopropyl is described in copending U.S. application No. 67,296, for steroid total synthesis process utilizing a cyanoalkyl A-ring precursor, the inventors being Cohen, Rosenberger and Saucy, which application was filed Aug. 26, 1970. The compounds of Formula IIIa or IIIb where $n$ is 1 or 3 may be prepared in an analogous manner to those above-described where $n$ is 2.

Where $R_3$ is hydrogen, compounds of Formula II may also be prepared according to the sequences shown in Reaction Scheme A. In one sequence, a vinyl ketone of the Formula VI is reduced to the vinyl diol VII using a chemical reducing agent. Suitable chemical reducing agents include complex metal hydrides, e.g. lithium aluminum hydride or sodium bis-2-methoxyethoxy aluminum hydride. The reduction may be carried out in any inert organic solvent, such as hydrocarbons, e.g. benzene or toluene; ethers, e.g. diethyl ether or tetrahydrofuran; and the like. A temperature range of from about −20° to about 50° C. may be employed.

The vinyl diol VII is then oxidized to the ketone IIIb–1. Suitable oxidizing agents include, for example, manganese dioxide. The reaction may be carried out in any inert organic solvent, for example, hydrocarbons, such as benzene or toluene. It is preferred to carry out the reaction in the presence of an organic amine, in which case the intermediate vinyl ketone of Formula IIIa–1 is trapped as its Mannich base addition product of Formula IIIb–1. Suitable amines are open chain or cyclic secondary organic amines such as diethylamine, pyrrolidine, piperidine and the like. The intermediate vinyl ketone of Formula IIIa–1 may also be trapped as an addition product with a hydrohalic acid, for example, hydrogen chloride or hydrogen bromide, to afford the corresponding haloketone of Formula IIIb–1. Halo ketones of Formula IIIb–1 may be converted back to the vinyl ketones of Formula IIIa–1 by treatment with a weak base. Suitable weak bases include tertiary organic amines, for example, pyridine, triethylamine and the like. This elimination reaction may be carried out in an inert organic solvent such as a hydrocarbon, e.g. benzene or toluene, at a temperature between about 0° and 100° C. The reaction may be also carried out in the absence of solvent, i.e., using the amine reactant as the solvent.

Compounds of Formulas IIIa–1 and IIIb–1 may then be converted to spirothiazines of Formula IIa as described above.

REACTION SCHEME A

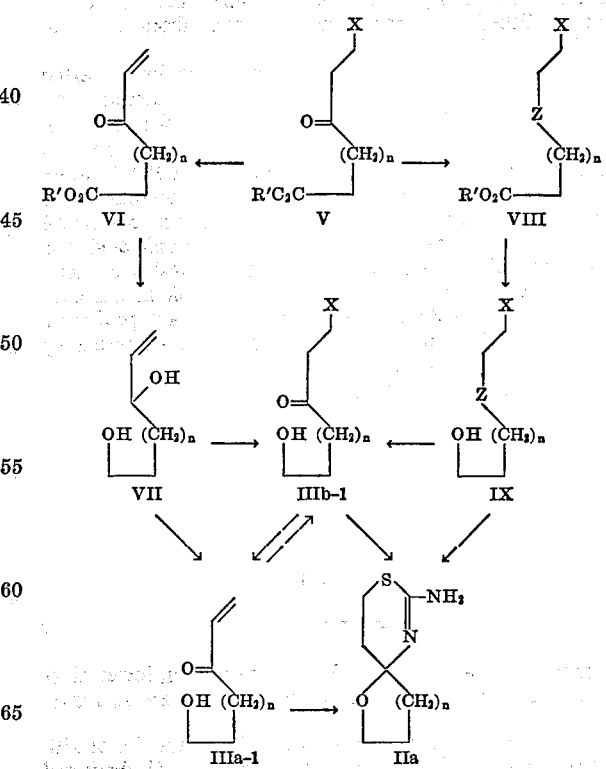

where X and $n$ are as above, Z is a ketalized oxo group and R′ is lower alkyl.

Alternatively, halo ketones or amine ketones of Formula V may be ketalized to afford compounds of Formula VIII. Suitable ketalization agents include for example lower alkanols, e.g. methanol, ethanol, butanol, and so forth; lower alkylene diols, e.g. ethylene glycol, 2,3-butylene glycol, 1,2-butylene glycol, 1,2-propylene glycol, and so forth; ortho-arylenediols, e.g. catechol; lower alkyl orthoformates, for example, trimethylorthoformate or triethylorthoformate; and so forth. The ketalization is carried out in the presence of a strong acid. Suitable strong acids include mineral acids, e.g. hydrochloric acid, sulfuric acid and the like; organic sulfonic acids, e.g. paratoluene sulfonic acid and the like; Lewis acids, e.g. boron trifluoride and the like; and so forth. The ketalization reaction may be carried out in any inert organic solvent. Suitable inert organic solvents include hydrocarbons, e.g. benzene or toluene; lower alkanols, e.g. methanol or ethanol; ethers, e.g. diethyl ether or tetrahydrofuran; and so forth. The ketalization reaction may be conducted at a temperature of from about 0° C. to about 150° C. The water of reaction may be removed either by azeotropic distillation or by reaction with a dehydrating agent for example, an alkyl orthoformate.

The ester group of Compound VIII may next be reduced to afford a compound of Formula IX. Any suitable chemical reducing agent may be employed although complex metal hydrides such as lithium aluminum hydride or sodium bis-2-methoxyethoxy aluminum hydride are preferred. The reaction may be carried out in any inert organic solvent, such as hydrocarbons, e.g. benzene or toluene; ethers, e.g. diethyl ether or tetrahydrofuran; and the like. The temperature of the reduction can range from about −20° to about 50° C.

The ketal of Formula IX is deketalized in a subsequent step to afford a compound of Formula IIIb-1 by reacting the ketal compound in an aqueous acidic medium. Suitable acids include mineral acids, e.g. hydrochloric acid or sulfuric acid; organic sulfonic acids, e.g. para-toluene sulfonic acid; alkanoic acids, e.g. acetic acid; and the like. If desired, an organic solvent may be employed as a cosolvent. Particularly preferred cosolvents are organic ketones, for example, acetone. The deketalization may be accomplished at a temperature of from about 0° C. to about 150° C.

The ketal of Formula IX may alternatively be converted to spirothiazine IIa by a novel one-step reaction with thiourea. The reaction conditions suitable for this conversion are identical to those described above for the conversion of compounds of Formula IIIa or IIIb to those of Formula II. However, an acid must be present in the reaction medium. The acid employed may be a mineral acid, e.g. hydrochloric acid; an organic sulfonic acid, e.g. p-toluenesulfonic acid or a lower alkanol acid, e.g. acetic acid. In a preferred embodiment, an alkanoic acid is used as the reaction solvent. Acetic acid is especially preferred. The acid addition salt formed can be decomposed by conventional methods.

Compounds of Formula Ie

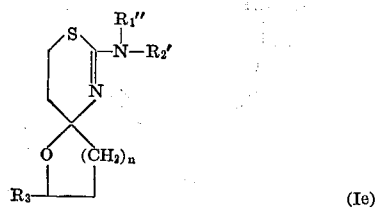

where $R_1''$ is as above and $R_2'$ is lower alkyl, lower alkenyl, aryl or aryl lower alkyl and $R_3$ and $n$ are as above, can be prepared from compounds of Formula IIIa or IIIb directly by reaction with the appropriate N,N-disubstituted thiourea, in the manner described above for the preparation of Compound II.

Compounds of Formula Id may also be prepared in this manner from the appropriate N-monosubstituted thiourea.

The compounds of Formula II where $n$ is 2 and $R_3$ is other than hydrogen or phenyl can be converted into medicinally useful steroids. Thus, these compounds can be condensed with, for example, a 2-alkyl-cyclopentan-1,3-dione to afford compounds of Formula IV,

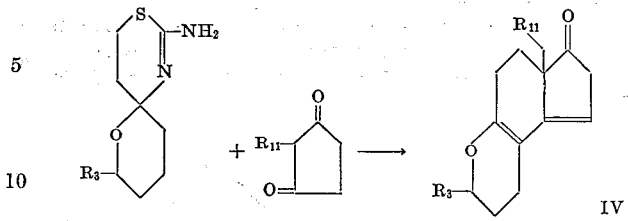

where $R_{11}$ is lower alkyl and $R_3$ is as above.

This reaction is carried out in the presence of a strong acid, preferably a mineral acid, e.g. hydrochloric acid, or an organic sulfonic acid, e.g. p-toluenesulfonic acid. The reaction may be performed in an inert reaction medium such as a hydrocarbon, e.g. benzene or toluene; an organic ether, e.g. tetrahydrofuran or dioxane, and so forth. The temperature can range from room temperature to about 150° C. A preferred temperature range is 80–120° C.

Compounds of Formula IV generally are known intermediates which have been converted into steroids of the 19-nor and 9β,10α (retro) series. The preparation of compounds of Formula IV where $R_3$ is 3-cyanopropyl, and their conversion to known useful steroids is described in U.S. patent application Ser. No. 67,296 cited previously.

Optically active compounds of Formulas I and II can be prepared by optical resolution of a racemic compound of Formula I or Formula II or by utilization of an optically active compound of Formula III in the condensation reaction with thiourea or a substituted thiourea, described above.

Optical resolution of racemic compounds of Formulas I and II may be accomplished by conventional procedures such as fractional crystallization of the diastereomeric addition salts of Compounds I or II with a chiral acid. Suitable chiral acids include strong acids such as organic sulfonic acids, e.g. antipodes of camphorsulfonic acid, bromocamphorsulfonic acid, etc.; and carboxylic acids, e.g. antipodes of tartaric acid, malic acid, menthoxy acetic acid, etc.

Surprisingly, it has been found that, when racemic compounds of Formulas I or II having only one chiral center (i.e., only the spiro carbon atom) are treated with a strong chiral acid, a larger than theoretical yield of one diastereomeric salt is obtained, indicating a dynamic equilibrium between the enantiomeric amines in the presence of the strong acid. Particularly preferred strong chiral acids are the antipodes of camphorsulfonic acid.

Reaction conditions and solvents for optical resolution of Compounds I or II are those conventionally used for optical resolutions and the choice of a particular solvent, temperature and resolving agent will depend upon the particular substrate to be resolved. Suitable solvents include lower alkanols, e.g. methanol or ethanol; lower alkyl ketones, e.g. acetone; acetonitrile; ethyl acetate; and so forth.

Conversly, it has been found that an optically active compound of Formula I or Formula II having only one chiral center, as described above, is racemized by treatment with a strong achiral acid. Suitable strong achiral acids include mineral acids, e.g. hydrochloric acid and sulfuric acid; organic sulfonic acids, e.g. p-toluene-sulfonic acid; and the like. The quantity of acid that can be employed is in the broad range of from about .1 mole percent to greater than 100 mole percent relative to the substrate to be racemized. Generally about 1 to about 20 mole percent of acid is preferred.

Suitable solvents include lower alkanols, e.g. methanol or ethanol; alkyl ketones, e.g. acetone; acetonitrile; ethyl acetate; dimethylformamide or mixtures of the above with water. The reaction temperature can vary from about 0° to about 150° C. A preferred temperature range is from about 50–100° C.

The compounds of Formula II are useful as intermediates for the preparation of medicinally valuable steroids as well as being precursors for the preparation of compounds of Formula I. Furthermore, the compounds of Formula II exhibit biological activity and are useful as anti-inflammatory agents, antialgal agents, amoebicides and anoretic agents.

The anti-inflammatory activity of compounds of Formula II may be demonstrated in warm-blooded animals by the carrageenin antiedema rat paw test. In this test, sixty male albino rats of the Royal Hart strain, weighing 125–155 grams, in groups of six are given 10 ml. of vehicle per kilogram of body weight. Water is given to bring the total volume to 5 ml. in each animal. The vehicle contains the test compound for the treatment groups. One hour later 0.05 ml. of a 1% type #7 carrageenin in normal solution is injected into the right rat hind paw. The paw volume is measured immediately after the injection of the phlogistic agent and again three hours later. The difference is recorded as volume of edema. Paw volume is measured by immersion of the paw into a column of Hg to an ink mark exactly at the level of the lateral malleolus. The initial and final paw volume is measured and the average volume edema in rat paw is calculated as the difference between the average final paw volume and average initial paw volume. The percent inhibition is calculated by subtracting the average control edema from the average treatment edema, dividing by the average control edema, and multiplying by 100. The percent inhibition is plotted against dose and the dose required to produce a 30% reduction in edema is estimated. This is the $ED_{30}$. A compound exhibiting an $ED_{30}$ of less than 100 mg./kg. p.o. in the test is considered to be active.

When utilized in the above test, racemic 2-amino-7-oxa-3-thia-1-azaspiro[5.5]undec-1-ene was found to be active.

The compounds of Formula I exhibit analgesic, anti-inflammatory, anti-pyretic and diuretic activity. Both anti-pyretic and analgesic activity may be measured, for example, by means of the yeast-inflamed foot test. In this test, 30 male rats are divided into six groups containing five rats per group. Control animals are given 1 cc./100 g. body weight of the vehicle. The test drug animals are given 200 mg./kg. of the drug in a concentration of 2% either orally or subcutaneously. Soluble and insoluble compounds are administered orally in an aqueous suspending vehicle. One hour after administration of the drug the rats are injected with 0.1 ml. of a 2% suspension of Brewer's yeast beneath the plantar surface of the foot. To determine anti-pyretic activity, two hours after drug injection and one hour after the irritant, the temperatures of the inflamed foot, the normal foot and the rectum are recorded with the help of a thermocouple. Results are reported as degrees change from control. A compound causing a 0.2° drop in inflamed foot temperature when administered at 10 mg./kg. p.o. is considered active in the test.

For the measurement of analgesic activity, the pain threshold was measured as the amount of pressure in the mm.-Hg required to induce the flight reaction (struggle) when applied to the foot. Air pressure from an air line was admitted through a needle valve to a 10 ml. syringe mounted with the plunger directed downward, to which was connected a short bullet-shape metal peg. The pressure was applied through the metal tip to the plantar surface of the rat's foot at the rate of 20 mm.-Hg per second. The end point was reached when the rats struggle. One group of five rats act as control. The pain threshold is the amount of pressure in mm-Hg required to induce the flight reaction. Pain results are obtained by subtracting control pressure readings from treated pressure readings for the inflamed foot. The results are expressed as change in pain threshold in mm.-Hg in the inflamed foot. The $ED_{50}$ is that dose which produces an increase in pain threshold of 50 mm.-Hg above control values in the inflamed foot. A compound exhibiting an $ED_{50}$ of less than 200 mg./kg. p.o. in the test is considered to be active. When employed in the above two tests, the following compounds were found to be active:

Racemic 2-phthalimido-7-oxa-3-thia-1-azaspiro [5.5]undec-1-ene.
Racemic 2-p-fluorobenzamido-7-oxa-3-thia-1-azaspiro[5.5]-undec-1-ene.
Racemic 2-cinnamamido-7-oxa-3-thia-1-azaspiro[5.5]undec-1-ene.
Racemic 2-p-nitrobenzamido-7-oxa-3-thia-1-azaspiro[5.5]undec-1-ene.
Racemic 2-(3,4-dimethoxybenzamido)-7-oxa-3-thia-1-azaspiro-[5.5]undec-1-ene.
Racemic 2-p-cyanobenzamido-7-oxa-3-thia-1-azaspiro-[5.5]undec-1-ene.
Racemic 2-p-methylbenzamido-7-oxa-3-thia-1-azaspiro[5.5]-undec-1-ene.
Racemic 2-m-fluorobenzamido-7-oxa-3-thia-1-azaspiro-[5.5]undec-1-ene.

The above results demonstrate the utility of the compounds of Formula I as anti-pyretic and analgesic agents.

That the above compounds are useful as therapeutic agents is further demonstrated by their generally low toxicity as expressed as $LD_{50}$. For example, the $LD_{50}$ for intraperitoneal administration in mice of racemic 2-p-fluorobenzamido-7-oxa-3-thia - 1 - azaspiro [5.5]undec-1-ene is greater than 400 mg./kg.

The compounds of Formulas I and II can be used in the form of conventional pharmaceutical preparations. For any particular subject the specific dosage and dosage regimen should be adjusted to individual need and the professional judgment of the person administering or supervising the administration of the compound. The daily dosage regimen may consist of unit or divided dosage forms. The conventional pharmaceutical preparations containing the compounds of Formula I or Formula II can contain them in admixture with conventional organic or inorganic inert carrier materials suitable for enteral or parenteral administration such as, for example, water, gelatin, lactose, starch, talc, vegetable oil, gum, polyalkylene glycols, vaseline and the like.

The preparations can be in conventional solid form, such as tablets, dragees, suppositories or capsules; or in conventional liquid form, such as solutions, suspensions or emulsions. They can be subjected to conventional pharmaceutical expedients such as sterilization and may contain conventional pharmaceutical additives such as preservatives, stabilizing agents, wetting or emulsifying agents, salts for adjusting osmotic pressure, buffers, etc. They also can contain other pharmaceutically active ingredients.

The following examples are illustrative of the invention but not limitative thereof. All temperatures are stated in degrees centigrade and all compounds are racemic unless otherwise specified.

EXAMPLE 1

A solution of 1.628 g. (0.0059 mole) of δ-(4,4-phenylenedioxy-1-pentyl)-δ-valerolactone in 15 ml. of dry tetrahydrofuran was stirred and cooled in a Dry-Ice acetone bath while 5 ml. (0.01 mole) of 2 M vinylmagnesium chloride in tetrahydrofuran was added, dropwise, over three minutes, keeping the internal temperature below −50°. The resulting mixture was stirred at −50−55° for 25 minutes then cautiously decomposed with 5 ml. of methanol, poured into ice and 20 ml. of saturated ammonium chloride and worked up with ether in the usual manner to afford 1.72 g. of 6-(4,4-phenylenedioxy-1-pentyl - 2 - vinyltetrahydropyran - 2 - ol (alternative nomenclature 11,11-phenylenedioxy-dodec - 1 - en-7-ol-3-one) as a yellow oil.

EXAMPLE 2

The vinyl adduct prepared in Example 1 was treated with 0.45 g. (0.0059 mole) of thiourea and 5 ml. of glacial acetic acid. The mixture got slightly warm and the thiourea slowly dissolved. The resulting yellow solution was stirred at room temperature for 18.5 hours then diluted with benzene and a small amount (~70 mg.) of white solid was filtered. The filtrate was concentrated at reduced pressure to a viscous orange oil which was dissolved in ether and the ether solution was washed three times with water. The combined aqueous washings were extracted once with ether then concentrated at reduced pressure to 1.689 g. of foam composed of a mixture of acetate salts. This material was redissolved in 10 ml. of water and basified to pH 8 with saturated aqueous sodium bicarbonate. The dense white precipitate was filtered with suction, washed well with water and dried under high vacuum giving 1.175 g. (55%) of off-white solid 2-amino-8 - [4,4-phenylenedioxy - 1 - pentyl]-7-oxa-3-thia-1-azaspiro[5.5]undec-1-ene. Several recrystallizations from acetonitrile gave product, M.P. 144–145°, $\nu_{max.}^{KBr}$ 3440, 3300, 3250, 1650, 1590, 1480, 1240 and 740 cm.$^{-1}$; $\lambda_{max.}^{EtOH}$ 283 m$\mu$ ($\epsilon$ 4170), $\lambda_{sh.}^{EtOH}$ 237 m$\mu$ ($\epsilon$ 8150); $\delta_{TMS}^{CDCl_3}$ 1.62, 4.53, 6.75, p.p.m.; Mass spectrum: m/e 362 (M+), 334 (M-28).

*Analysis.*—Calcd. for $C_{19}H_{26}N_2O_3S$ (percent): C, 62.94; H, 7.24; N, 7.73; S, 8.84. Found (percent): C, 63.24; H, 7.32; N, 7.74; S, 8.88.

EXAMPLE 3

A solution of 10 g. (0.045 mole) of δ-[(3,5-dimethyl-4-isoxazolyl)ethyl]-δ-valerolactone in 150 ml. of dry tetrahydrofuran was stirred and cooled with a Dry-Ice-acetone bath while 3.5 ml. (0.075 mole) of 2 M vinylmagnesium chloride in tetrahydrofuran was added dropwise at such a rate as to keep the internal temperature at approximately −60°. The resulting mixture was stirred at −70° for 15 minutes then decomposed with 5 ml. of methanol, poured onto a mixture of ice, 24 g. of ammonium chloride and 8 ml. of glacial acetic acid and worked up with ether in the usual manner to afford 6-[(3,5-dimethyl-4-isoxazolyl)ethyl]-2-vinyl-tetrahydropyran - 2 - ol [alternative nomenclature 9 - (3,5 - dimethylisozaxol-4-yl)-non-1-en-7-ol-3-one].

EXAMPLE 4

The material prepared in Example 3 was treated with 3.4 g. (0.045 mole) of thiourea and 50 ml. of glacial acetic acid. The resulting solution was stirred at room temperature for 20 hours and then concentrated at reduced pressure. The residue was treated with ether and 1 N aqueous hydrochloric acid. The aqueous acidic layer was separated and washed once with ether (the combined ether solutions were discarded) and then basified with 10% aqueous sodium hydroxide solution and worked up with ether in the usual manner giving 11.0 g. of a mixture of isomers of 2-amino-8-[2-(3,5-dimethyl-4-isoxazolyl)ethyl]-7-oxa-3-thia-1-azaspiro[5.5]undec-1-ene.

In another experiment, the crude product, prepared in the manner described above (7.2 g.) was recrystallized four times from acetonitrile giving 2.8 g. of colorless solid, M.P. 124–126° which was essentially one pure isomer. An analytical specimen was obtained by repeated recrystallization of a sample from acetonitrile as white solid, M.P. 126–127°;

$\nu_{max.}^{CHCl_3}$ 3500, 3400, 1640, 1580 cm.$^{-1}$; $\lambda_{max.}^{EtOH}$ 210–215 m$\mu$ ($\epsilon$ 11750), $\lambda_{max.}^{0.1 N HCl}$ 210, 220 m$\mu$ ($\epsilon$ 24000); $\delta_{TMS}^{CDCl_3}$ 4.58, 3.85, 2.28, 2.19, 3.06, 2 p.p.m.; mass spectrum: m/e 309 (M+), 281 (M-28).

*Analysis.*—Calcd. for $C_{15}H_{23}N_3O_2S$ (percent): C, 58.23; H, 7.49; N, 13.58; S, 10.35. Found (percent): C, 58.36; H, 7.43; N, 13.78; S, 10.22.

In another run, 2 g. of the crude product was purified by dry-column chromatography on a 2″ x 2″ column of 800 g. of grade III alumina, developed with 400 ml. of 9:1 benzene:triethylamine. This furnished a nearly pure sample of the other isomer. Recrystallization from benzene-hexane gave an analytical specimen M.P. 153–154°;

$\nu_{max.}^{CHCl_3}$ 3500, 3400, 1640, 1620, 1580, cm.$^{-1}$; $\lambda_{infl.}^{EtOH}$ 215 m$\mu$ ($\epsilon$ 12400); $\delta_{TMS}^{CDCl_3}$ 4.39, 3.5, 3.0, 2.30, 2.20 p.p.m.; mass spectrum: m/e 309 (M+), 281 (M-28).

*Analysis.*—Calcd. for $C_{15}H_{23}N_3O_2S$ (percent): C, 58.23; H, 7.49; N, 13.58; S, 10.35. Found (percent), C, 58.44; H, 7.55; N, 13.55; S, 10.36.

EXAMPLE 5

δ-Phenyl-δ-valerolactone was prepared by sodium borohydride reduction of 4-benzoylbutyric acid. The material obtained had M.P. 72–74° (reported M.P. 74–76°) after recrystallization from benzene-hexane.

EXAMPLE 6

A solution of 10.4 g. (0.059 mole) of δ-phenyl-δ-valerolactone in 150 ml. of dry tetrahydrofuran was stirred and cooled with a Dry-Ice-acetone bath while 50 ml. (0.1 mole) of 2 M vinyl magnesium chloride in tetrahydrofuran was added dropwise over 25 minutes keeping the internal temperature between −50° and −60°. The precipitated starting lactone slowly dissolved and the resulting solution was stirred at −60° to −70° for 15 minutes. After cautions, dropwise addition of 10 ml. of methanol while still cold, the reaction mixture was poured onto a mixture of ice and saturated ammonium chloride and worked up with ether giving 12.65 g. of crude 6-phenyl-2-vinyl-tetrahydropyran-2-ol (alternative nomenclature 7-phenyl-hept-1-en-7-ol-3-one) as a viscous yellow oil.

EXAMPLE 7

The product from Example 6 was treated with 4.5 g. (0.059 mole) of thiourea and 50 ml. of glacial acetic acid and the resulting mixture (mildly exothermic on mixing reactants) was stirred at room temperature for 18 hours. The resulting organic solution was concentrated at reduced pressure to a syrupy residue which was treated with ether and 1 N aqueous hydrochloric acid. This caused the formation of a dense precipitate which was suction filtered, washed well with ether and set aside. The combined filtrate and washings were separated into an ether layer and an aqueous layer. The aqueous layer was extracted once more with ether and set aside. The combined ether extracts were washed with brine, dried (MgSO$_4$), filtered and concentrated at reduced pressure giving 4.2 g. of neutral by-products as an orange oil.

The solid and aqueous acidic solution above which had been set aside were combined and basified with 10% aqueous sodium hydroxide. Workup in the usual manner with methylene chloride gave 11.4 g. of an orange semi-solid mixture of isomers of 2-amino-8-phenyl-7-oxa-3-thia-1-azaspiro[5.5]undec-1-ene. A 10.9 g. sample of this material was dissolved in 25 ml. of hot acetonitrile and added to 5.3 g. of maleic acid dissolved in 25 ml. of hot acetonitrile. The resulting solution was concentrated at reduced pressure and the residue was triturated under ether giving a solid. Filtration and ether washing gave tan solid, M.P. 159–164° composed of a mixture of maleate salts of the above isomers. This material was digested in 75 ml. of boiling acetonitrile then chilled and filtered. After drying, one of the isomeric maleates was obtained as an off-white solid, M.P. 169–170°.

*Analysis.*—Calcd. for $C_{18}H_{22}N_2O_5S$ (percent): C, 57.13; H, 5.86; N, 7.40; S, 8.47. Found (percent): C, 57.45; H, 5.98; N, 7.53; S, 8.47.

In another experiment the crude mixture of bases (3.1 g.) was triturated with ethyl acetate giving 0.79 g. of white solid, M.P. 164–165°. Recrystallization of a sample obtained in this manner from acetonitrile gave the analytical specimen of the other isomer as white solid, M.P. 166–167°.

$\nu_{max.}^{CHCl_3}$ 3500, 3400 1670, 1650, 1610 cm.$^{-1}$; $\lambda_{max.}^{EtOH}$ 203 ($\epsilon$ 19200), 255 (290), 261 (182) m$\mu$; $\delta_{TMS}^{DMSO}$ 7.3 6.0, 4.6, 2.91, 1.01, p.p.m.: Mass spectrum: m/e 262 (M$^+$), 234 (M−28).

*Analysis.*—Calcd. for $C_{14}H_{18}N_2OS$ (percent): C, 64.10; H, 6.92; N, 10.68; S, 12.20. Found (percent): C, 64.31; H, 6.86; N, 10.74; S, 12.07.

The filtrate after removal of this second isomer was diluted to 100 ml. and stirred with 60 g. of grade I alumina then filtered. Concentration of the filtrate gave 0.4 g. of the first isomer which crystallized on standing. Recrystallization from benzene-hexane gave the analytical specimen as white solid, M.P. 102–103°.

$\nu_{TMS}^{CHCl_3}$ 3500, 3400, 1630, 1580 cm.$^{-1}$, $\nu_{max.}^{KBr}$ 3400, 3300, 3250, 3125, 1640, 1600, 1580 cm.$^{-1}$; $\lambda_{infl.}^{EtOH}$ 206 m$\mu$ ($\epsilon$ 16000); $\delta_{TMS}^{CDCl_3}$ 8.30, 5.11, 4.50, 3.16, 2 p.p.m.; Mass spectrum: m/e 262 (M$^+$), 234 (M−28).

*Analysis.*—Calcd. for $C_{14}H_{18}N_2OS$ (percent): C, 64.10; H, 6.92; N, 10.68; S, 12.20. Found (percent): C, 64.27; H, 6.85; N, 10.60; S, 12.07.

EXAMPLE 8

Mannich base 6-phenyl-2-(2-diethylaminoethyl)-tetrahydropyran-2-ol was prepared by treatment of crude vinyl adduct (prepared as described in Example 6) with diethylamine. The crude Mannich base was purified by extraction with acid. A yellow oil was obtained.

A mixture of 1.55 g. (0.0056 mole) of Mannich base prepared in this manner, 0.44 g. (0.058 mole) of thiourea, 5 ml. of glacial acetic acid and 15 ml. of toluene was stirred and refluxed for 75 minutes. The resulting solution was cooled, diluted with ether and treated with 60 ml. of 3 N aqueous HCl. The precipitated solid was filtered with suction giving 1.2 g., M.P. 230–231° dec. This material was basified with 10% aqueous sodium hydroxide and worked up with methylene chloride in the usual manner giving 1.1 g. of a mixture of the two isomers prepared in Example 7. Trituration with benzene and filtration gave 0.394 g. of solid, M.P. 160–161° which was largely the second isomer. Concentration of the filtrate gave 0.25 g. of solid, M.P. 102–103° which was largely the first isomer.

EXAMPLE 9

A solution of 18.9 g. (0.166 mole) of δ-methyl-δ-valerolactone (prepared from 4-acetylbutyric acid by sodium borohydride reduction) in 100 ml. of dry tetrahydrofuran was stirred and cooled to −60° with a Dry-Ice acetone bath (the lactone precipitated) while 150 ml. (0.3 mole) of 2 M vinylmagnesium chloride was added dropwise over 20 minutes (the lactone dissolved). The temperature was kept below −45°. After stirring for 10 minutes at −60°, the reaction mixture was cautiously decomposed by dropwise addition of 35 ml. of methanol while still cold, then poured on a mixture of ice and saturated aqueous ammonium chloride. Workup with ether in the usual manner afforded crude 6-methyl-2-vinyl-tetrahydropyran-2-ol (alternative nomenclature 7-hydroxy-oct-1-en-3-one).

EXAMPLE 10

The vinyl adduct prepared in Example 9 was treated with 12.63 g. (0.166 mole) of thiourea and 100 ml. of glacial acetic acid. The reaction was stirred at room temperature for 20 hours then the resulting orange solution was concentrated at reduced pressure. The syrupy residue was treated with ether and 1 N aqueous hydrochloric acid. The aqueous layer was separated and washed once with ether then set aside. The combined ether extracts were washed once with brine, dried (MgSO$_4$), filtered and concentrated at reduced pressure giving 9.5 g. of oily neutral by-products.

The aqueous acidic solution which had been set aside was made alkaline with 10% aqueous sodium hydroxide and worked up with methylene chloride in the usual manner giving 23.7 g. of an oily mixture of isomers of 2-amino - 8 - methyl-7-oxa-3-thia-1-azaspiro[5.5]undec-1-ene. This material was triturated with ether and refrigerated. Suction filtration gave 3.8 g. of a pale-yellow solid, M.P. 114–115.5°, TLC analysis indicated this was predominantly one isomer.

Concentration of the combined ether filtrate and washings above gave 18.4 g. of yellow oil which was a mixture of isomers. This was dissolved in 100 ml. of ether and treated with a solution of 10.7 g. of maleic acid in 80 ml. of ethyl acetate. The resulting mixture was treated with 100 ml. of ether and crystalization was induced by scratching. After refrigeration, the precipitated solid was filtered, washed with ether and dried giving 22.5 g. of yellow solid. Recrystallization from 40 ml. of acetonitrile gave 17.2 g. of slightly off-white solid, M.P. 135–144° (mixture of isomeric maleate salts).

*Analysis.*—Calcd. for $C_{19}H_{16}N_2OS \cdot C_4H_4O_4$ (percent): C, 49.36; H, 6.37; N, 8.86; S, 10.12. Found (percent): C, 49.26; H, 6.28; N, 8.85; S, 10.01.

In another experiment, the crude mixture of isomers (3.6 g.) was triturated with benzene and filtered giving 0.55 g. of solid, TLC analysis of which indicated it was essentially the pure second isomer. Recrystallization from benzene containing a few drops of acetonitrile gave white solid, M.P. 144–145°.

$\nu_{max.}^{CHCl_3}$ 3500, 3400, 1650, 1625, 1580 cm.$^{-1}$; $\lambda_{max.}^{EtOH}$ 202 m$\mu$ ($\epsilon$ 19050), $\lambda_{max.}^{0.1\,N\,HCl}$ 207 m$\mu$ ($\epsilon$ 12650), $\lambda_{infl.}^{0.1\,N\,HCl}$ 227 m$\mu$ ($\epsilon$ 8000); $\delta_{TMS}^{CDCl_3}$ 4.67, 3.67, 2.93, 1.20 p.p.m.; Mass spectrum: m/e 200 (M$^+$), 172 (M−28).

*Analysis.*—Calcd. for $C_9H_{16}N_2OS$ (percent): C, 53.98; H, 8.06; N, 13.99; S, 15.98. Found (percent): C, 54.04; H, 8.15; N, 13.83; S, 15.74.

The combined mother liquor from the above filtration was concentrated and the residue purified by dry-column chromatography on 1 kg. of grade III alumina (2" x 24" column). After development with 700 ml. of 9:1 ethyl acetate:triethylamine, the bands were eluted with methanol giving 1.1 g. of the first isomer, 0.5 g. of the second isomer and 0.6 g. of mixture. The oily first isomer thus obtained could not be induced to crystallize but was treated with 0.58 g. of maleic acid and the resulting maleate salt recrystallized from ethyl acetate then acetonitrile giving white solid M.P. 139–141°.

$\lambda_{max.}^{EtOH}$ 209 m$\mu$ ($\epsilon$ 26500)

*Analysis.*—Calcd. for $C_{13}H_{20}N_2O_5S$ (percent): C, 49.36; H, 6.37; N, 8.86; S, 10.12. Found (percent): C, 49.47; H, 6.50; N, 8.75; S, 10.14.

The free base regenerated from this maleate was an oil.

$\nu_{max.}^{CHCl_3}$ 3500, 3400, 1630, 1620 (sh.), 1580 cm.$^{-1}$; $\lambda_{max.}^{EtOH}$ 204 ($\epsilon$ 8715); $\delta_{TMS}^{CDCl_3}$ 4.55, 4.13, 3.00, 1.10 p.p.m.; Mass spectrum: m/e 200 (M$^+$), 172 (M−28).

EXAMPLE 11

A mixture of 10 g. (0.0465 mole) of Mannich base 6-methyl-2-(2-diethylaminoethyl) - tetrahydropyran-2-ol (prepared by reacting the vinyl adduct prepared in Example 9 with diethylamine), 3.65 g. (0.048 mole) of thiourea, 35 ml. of glacial acetic acid and 105 ml. of toluene was stirred and refluxed for 75 minutes. The resulting solution was cooled, extracted with 2 N aqueous hydrochloric acid and discarded. The aqueous acidic extract was basified with 10% aqueous sodium hydroxide and worked up in the usual manner with ether giving 6.9 g. of the mixture of isomers prepared in Example 10. Trituration with benzene and filtration gave 1.65 g. of solid which was largely the second isomer. The mother liquors contained mainly the first isomer.

EXAMPLE 12

A mixture of 14.07 g. (0.07 mole) of 2-(diethylaminoethyl)-tetrahydropyran-2-ol, 5.6 g. (0.073 mole) of thiourea, 70 ml. of glacial acetic acid and 220 ml. of toluene was stirred and refluxed for 75 minutes. The resulting solution was cooled and extracted with 1 N aqueous hydrochloric acid. The aqueous acidic solution was made alkaline with 10% aqueous sodium hydroxide and worked up with ether in the usual manner giving 10.7 g. of yellow solid. Recrystallization from 60 ml. of ethyl acetate gave 7.4 g. of 2-amino-7-oxa-3-thia-1-azaspiro[5.5]undec-1-ene, M.P. 138–140°. An analytical specimen was obtained by further recrystallization from ethyl acetate as white solid, M.P. 139–140.5°.

$\nu_{max.}^{KBr}$ 3375, 3300, 3250, 3150, 1640, 1590 cm.$^{-1}$; $\lambda_{max.}^{EtOH}$ end absorption 200 m$\mu$ ($\epsilon$ 10200); mass spectrum: m/e 186 (M$^+$), 158 (M–28).

*Analysis.*—Calcd. for $C_8H_{14}N_2OS$ (percent): C, 51.60; H, 7.58; N, 15.04; S, 17.19. Found (percent): C, 51.68; H, 7.70; N, 15.25; S, 17.44.

The maleate was obtained as colorless solid, M.P. 164–165° by recrystallization from ethanol;

$$\lambda_{max.}^{EtOH}\ 208\ m\mu\ (\epsilon\ 27400)$$

*Analysis.*—Calcd. for $C_8H_{14}N_2OS \cdot C_4H_4O_4$ (percent): C, 47.68; H, 6.00; N, 9.27; S, 10.59. Found (percent): C, 47.41; H, 5.78; N, 9.18; S, 10.71.

The starting material, 2-(2-diethylaminoethyl)-2-hydroxytetrahydropyran was prepared as follows: 25.2 g. of 6-heptan-1,5-diol in 1,2-dichloroethane was maintained under nitrogen and treated with cooling with 100 ml. of diethylamine and 208 g. of activated manganese dioxide. After stirring at room temperature under nitrogen for one day, the mixture was filtered and the residue washed with benzene. The combined filtrates were evaporated to afford the crude product as a brown oil. The crude product could be purified by extraction into dilute hydrochloric acid, neutralization and reextraction into an organic solvent. An analytical sample of 2-(2-diethylaminoethyl)-2-hydroxy-tetrahydropyran was obtained by purifying the above sample on a column of alumina (III).

*Analysis.*—Calcd. for $C_{11}H_{23}NO_2$ (percent): C, 65.63; H, 11.52; N, 6.96. Found (percent): C, 65.80; H, 11.52; N, 6.69.

EXAMPLE 13

A solution of 0.15 g. of (+)-2-p-fluorobenzamido-7-oxa-3-thia-1-azaspiro[5.5]undec-1-ene[$\alpha$]$_D$ +33.27° (c.=1, CHCl$_3$)) prepared as described in Example 50, infra, and 0.01 g. of p-toluenesulfonic acid monohydrate in 5 ml. of ethanol was heated on a steam bath for 10 minutes, then poured into saturated aqueous sodium bicarbonate solution. The mixture was extracted with methylene chloride. The methylene chloride extracts were combined, washed with brine, dried, filtered and concentrated at reduced pressure giving 0.142 g. of colorless solid, racemic 2-p-fluorobenzamido-7-oxa-3-thia-1-azaspiro[5.5]undec-1-ene, M.P. 147–149° [$\alpha$]$_D$ 0° (c.=1, CHCl$_3$).

EXAMPLE 14

A solution of 0.56 g. (2.14 mmoles) of a crude mixture of isomeric aminothiazines prepared as in Examples 7 and 8 in 3 ml. of acetic anhydride and 6 ml. of pyridine was allowed to stand at room temperature for 19 hours, then concentrated at reduced pressure. The residue was treated with saturated, aqueous sodium bicarbonate and extracted with ether. The ether layer was separated and the aqueous layer was extracted once with ether. The combined ether extracts were washed three times with 1 N aqueous hydrochloric acid then discarded. The combined acidic extracts were made alkaline with 3 N aqueous sodium hydroxide and worked up with ether in the usual manner giving 0.531 g. of colorless gum composed of a mixture of isomers of 2-acetamido-8-phenyl-7-oxa-3-thia-1-azaspiro[5.5]undec-1-ene.

A 0.876 g. sample of material prepared in this way was chromatographed on 45 g. of silica gel. The fractions eluted with 4:1 benzene:ether furnished 0.547 g. of one pure isomer as a colorless glass which could not be induced to crystallize. Drying a sample for several days under high vacuum afforded an analytical specimen.

$\lambda_{max.}^{EtOH}$ 208 (13980), 235 (7250), 262 (11650); $\lambda_{max.}^{0.1\ N\ HCl}$ 224 (11500), 244 (12200) m$\mu$; $\nu_{max.}^{CHCl_3}$ 3400, 1700, 1595, 1550 cm.$^{-1}$; $\delta_{max.}^{CDCl_3}$ 2.14, 2.75, 3.51, 4.76, 7.30 p.p.m.; Mass spectrum: m/e 403 (M$^+$).

*Analysis.*—Calcd. for $C_{16}H_{20}N_2O_2S$ (percent): C, 63.12; H, 6.64; N, 9.20; S, 10.53. Found (percent): C, 63.42; H, 6.71; N, 9.03; S, 10.57.

The fractions eluted with 1:1 benzene:ether and ether gave 0.180 g. of pure second isomer as a pale-yellow solid. Two recrystallizations from benzene-hexane gave the analytical specimen as fluffy, white needles, M.P. 144–145°.

$\lambda_{max.}^{EtOH}$ 210 (10500), 264 (14250); $\lambda_{sh.}^{EtOH}$ 240 (7300) m$\mu$; $\lambda_{max.}^{0.1\ N\ HCl}$ 226 (11500), 245 (12120), m$\mu$; $\nu_{max.}^{CHCl_3}$ 3400, 1710, 1600, 1550 cm.$^{-1}$; $\delta_{TMS}^{CDCl_3}$ 2.09, 2.77, 3.21, 4.56, 7.32 p.p.m.; Mass spectrum: m/e 304 (M$^+$), 276 (M–28).

*Analysis.*—Calcd. for $C_{16}H_{20}N_2O_2S$ (percent): C, 63.12; H, 6.64; N, 9.20; S, 10.53. Found (percent): C, 63.06; H, 6.73; N, 9.22; S, 10.50.

EXAMPLE 15

A 1 g. (0.05 mole) sample of a mixture of amines prepared as in Examples 10 and 11 was dissolved in 10 ml. of pyridine and 5 ml. of acetic anhydride was added. The resulting solution was kept at room temperature for 3.25 hours, then concentrated at reduced pressure. The residue was dissolved in ether and the ether solution was washed three times with 1 N aqueous hydrochloric acid. The combined acid extracts were washed once with ether and the combined ether solutions discarded. The acid solution was basified with 10% aqueous sodium hydroxide, saturated with salt and worked up with ether in the usual manner giving 0.889 g. of a mixture of isomers of 2-acetamido-8-methyl-7-oxa-3-thia-1-azaspiro[5.5]undec1-ene as a yellow gum. This material was chromatographed on 45 g. of silica gel. The fractions eluted with 4:1 benzene:ether furnished 0.152 g. of one pure isomer. The fractions eluted with 1:1 benzene:ether and ether gave 0.573 g. of the other pure isomer.

A sample of the first isomer purified in this manner was recrystallized twice from hexane giving the analytical specimen as white solid, M.P. 113–114.5°.

$\lambda_{max.}^{EtOH}$ 220 (6250), 238 (6650), 266 (13800) m$\mu$, $\nu_{max.}^{CHCl_3}$ 3400, 1700, 1595, 1550 cm.$^{-1}$; $\delta_{TMS}^{CDCl_3}$ 1.12, 2.12, 2.72, 3.53, 3.78 p.p.m.; Mass spectrum: m/e 242 (M$^+$), 227 (M–15), 214 (M–28).

*Analysis.*—Calcd. for $C_{11}H_{18}N_2O_2S$ (percent): C, 54.53; H, 7.49; N, 11.56; S, 13.21. Found (percent): C, 54.37; H, 7.66; N, 11.67; S, 13.41.

A sample of the second isomer, purified as described above was recrystallized twice from hexane-benzene giving white solid, M.P. 106–107°.

$\lambda_{max.}^{EtOH}$ 222 (6650), 239 (7150), 264 (14020); $\lambda_{max.}^{0.1\ N\ HCl}$ 223 (11000), 245 (12180) m$\mu$; $\nu_{max.}^{CHCl_3}$ 3400, 1710, 1600, 1550 cm.$^{-1}$; $\delta_{TMS}^{CDCl_3}$ 1.17, 2.07, 2.67, 3.19, 3.61 p.p.m.; Mass spectrum: m/e 242 (M$^+$), 227 (M–15), 214 (M–28).

*Analysis.*—Calcd. for $C_{11}H_{18}N_2O_2S$ (percent): C, 54.53; H, 7.49; N, 11.56; S, 13.21. Found (percent): C, 54.72; H, 7.62; N, 11.59; S, 13.00.

EXAMPLE 16

A solution of 8.05 g. (0.0433 mole) of amine prepared as in Example 12 in 64 ml. of pyridine and 40 ml. of acetic anhydride was kept at room temperature for 4.5 hours, then concentrated to dryness at aspirator pressure. The residue was dissolved in ether and the ether solution was washed with two 25 ml. portions of 1.8 N aqueous hydrochloric acid solution. The combined aqueous acid extracts were washed once with ether and the combined ether solutions were discarded. The acid solution was chilled, basified (pH 8–9) with 40 ml. of 10% aqueous sodium hydroxide, saturated with salt and worked up with ether in the usual manner. This afforded to 9.5 g. of pale-yellow crystalline 2-acetamido-7-oxa-3-thia-1-azaspira[5.5]undec-1-ene. A sample from a similar run was chromatographed on silica gel (eluted with 3:1 benzene-ether to ether) and recrystallized twice from benzene-hexane giving an analytical specimen as colorless solid, M.P. 110–111.5°.

$\lambda_{max.}^{EtOH}$ 219 (7050), 236 (6570), 263 (13100) m$\mu$; $\nu_{max.}^{CHCl_3}$ 3400, 1710, 1590, 1550 cm.$^{-1}$; $\delta_{TMS}^{CDCl_3}$ 1.74, 2.12, 2.77, 3.49, 3.73 p.p.m. Mass spectrum: m/e 228 (M$^+$) 213 (M−15), 200 (M−28).

*Analysis.*—Calcd. for $C_{10}H_{16}N_2O_2S$ (percent): C, 52.62; H, 7.07; N, 12.27; S, 14.02. Found (percent): C, 52.40; H, 7.12; N, 12.28; S, 14.07

EXAMPLE 17

A solution of 0.927 g. (3 mmoles) of a mixture of aminothiazines prepared as in Example 4, 0.375 g. (3.34 mmoles) of 2-methylcyclopentane-1,3-dione and 0.12 g. of p-toluenesulfonic acid monohydrate in 5 ml. of water and 10 ml. of dioxane was stirred and refluxed for 92 hours. The resulting solution was cooled and poured into dilute aqueous hydrochloric acid and worked up in the usual manner (the ether extracts were additionally washed twice with saturated aqueous sodium bicarbonate solution—the aqueous acidic solution was saved for recovery of starting material) giving 0.57 g. of an orange oil. This material was stirred and refluxed in 15 ml. of benzene containing 29 mg. of p-toluenesulfonic acid monohydrate for 40 minutes. A Dean-Stark trap was used to remove water. The resulting green solution was cooled, diluted with ether and washed with aqueous sodium bicarbonate. The usual workup gave 0.47 g. of crystalline 3-[2-(3,5-dimethyl - 4 - isoxazolyl)ethyl]6a$\beta$-methyl-1,2,3,5,6,6a - hexahydrocyclopenta[f][1]benzopyran-7(8H)-one. This material was chromatographed on 25 g. of silica gel. The fractions eluted with 19:1 benzene-ether afforded 0.398 g. of essentially pure material. Recrystallization from 2-propanol gave 0.307 g. of yellow crystals, M.P. 107–110° (reported M.P. 113–116°), $\lambda_{max.}^{EtOH}$ 253 (20100)

*Analysis.*—Calcd. for $C_{20}H_{25}NO_3$ (percent): C, 73.36; H, 7.70; N, 4.28. Found (percent): C, 73.60; H, 7.45; N, 4.20.

EXAMPLE 18

A solution of 29 g. (0.226 mole) of $\delta$-ethyl-$\delta$-valerolactone in 130 ml. of dry tetrahydrofuran was stirred with cooling to −60° (Dry Ice-acetone bath) while 200 ml. of 2.6 M vinylmagnesium chloride in tetrahydrofuran was added dropwise over 0.5 hour, keeping the temperature between −50 and −60°. The mixture was stirred at −65° for 10 minutes then treated cautiously with 30 ml. of methanol keeping the temperature below −45°. After pouring into a mixture of ice and ammonium chloride, the organic products were extracted three times with ether. The combined organic extracts were washed once with brine, dried over anhydrous magnesium sulfate and concentrated at reduced pressure giving 37.2 g. of orange oily, 6-ethyl-2-vinyl-tetrahydropyran - 2 - ol (alternative nomenclature 7-hydroxy-non-1-en-3-one).

This material was immediately treated with 17.2 g. (0.226 mole) of thiourea and 140 ml. of glacial acetic acid. The resulting mixture was stirred at room temperature for 16.5 hours then the acetic acid was removed at reduced pressure.

To the residue was added 85 ml. of 3 N aqueous hydrochloric acid and 50 ml. of water and the entire mixture was extracted twice with ether. The ether extracts were discarded. The aqueous solution was chilled in ice and the precipitated solid was filtered and washed with ice water. After drying, 12.7 g. of almost colorless 2-amino-8-ethyl-7 - oxa-3-thia-1-azaspiro[5.5]undec-1-ene hydrochloride, M.P. 213–214.5° dec. was obtained. A sample was recrystallized twice from water giving an analytical specimen, as slightly off-white solid, M.P. 211–212°.

*Analysis.*—Calcd. for $C_{10}H_{18}N_2OS \cdot HCl$ (percent): C, 47.89; H, 7.64; N, 11.17; S, 12.78. Found (percent): C, 48.12; H, 7.75; N, 11.44; S, 12.31.

The combined acidic aqueous filtrate and washings above were made alkaline with concentrated ammonium hydroxide and extracted three times with methylene chloride. The combined organic extracts were dried over anhydrous magnesium sulfate, filtered and concentrated at reduced pressure giving 19.8 g. (41%) of free amine (mixture of isomers).

EXAMPLE 19

A solution of 1.42 g. (6.63 mmoles) of the crude, oily free base mixture prepared in Example 18 in 10 ml. of pyridine and 6 ml. of acetic anhydride was kept at room temperature for four hours then concentrated at reduced pressure. The residue was dissolved in ether and washed twice with 5 ml. of 1.8 N aqueous hydrochloric acid. The combined acid washes were extracted once with ether and the ether solutions containing neutral impurities were discarded.

The acid solution was made alkaline with potassium carbonate and extracted with ether twice. The ether extracts were combined, dried over anhydrous magnesium sulfate, filtered and concentrated at reduced pressure giving 1.0 g. of a yellow oil composed of a mixture of isomers of -2-acetamido-8-ethyl-7-oxa-3-thia-1-azaspiro[5.5]undec-1-ene.

This material was chromatographed on 50 g. of silica gel. Fractions eluted with 4:1 benzene:ether gave 0.443 g. of one isomer as a pale-yellow oil which crystallized after a long period of refrigeration.

Elution with 1:1 benzene:ether and ether gave 0.358 g. of the other isomer as a pale-yellow oil which also crystallized after storage at 0°.

Analytical samples of both compounds were prepared by recrystallization from benzene-hexane.

First isomer: Off-white solid, M.P. 79–80°.

UV: $\lambda_{max.}^{EtOH}$ 222 m$\mu$ ($\epsilon$ 7250), 238 (7380), 265 (15900); $\lambda_{max.}^{0.1\ N\ HCl}$ 225 m$\mu$ ($\epsilon$ 11350), 246 (12600). IR: $\nu_{max.}^{KBr}$ 3250, 1675, 1615 cm.$^{-1}$; $\nu_{max.}^{CHCl_3}$ 3100–3400, 1700, 1595, 1550 cm.$^{-1}$. NMR: $\delta_{TMS}^{CDCl_3}$ 3.54, 2.72, 2.11, 0.86 p.p.m. MS: m/e 256 (M$^+$), 241, 227, 139, 43 (base).

*Analysis.*—Calcd. for $C_{12}H_{20}N_2O_2S$ (percent): C, 56.22; H, 7.86; N, 10.93; S, 12.51. Found (percent): C, 56.40; H, 7.80; N, 10.81; S, 12.53.

Second isomer: Colorless solid, MP. 98–99°.

UV: $\lambda_{max.}^{EtOH}$ 223 m$\mu$ ($\epsilon$ 6450), 243 (7150), 265 (14950); $\lambda_{max.}^{0.1\ N\ HCl}$ 224 m$\mu$ ($\epsilon$ 11100), 247 (12000).
IR: $\nu_{max.}^{KBr}$ 3110–3400, 1595, 1555 cm.$^{-1}$; $\nu_{max.}^{CHCl_3}$ 3400, 3100–3400, 1710, 1605, 1555 cm.$^{-1}$.
NMR: $\delta_{TMS}^{CDCl_3}$ 3.33, 3.24, 2.68, 2.08, 0.92 p.p.m.
MS: m/e 256 (M$^+$), 241, 228 (M−28), 139, 43 (base).

*Analysis.*—Calcd. for $C_{12}H_{20}N_2O_2S$ (percent): C, 56.22; H, 7.86; N, 10.93; S, 12.50. Found (percent): C, 56.41; H, 7.90; N, 10.82; S, 12.46.

EXAMPLE 20

A mixture of 6 g. (32.2 mmoles) of 2-amino-7-oxa-3-thia-1-azaspiro[5.5]undec-1-ene prepared as in Example 12, 4.63 g. (33 mmoles) of benzoyl chloride and 40 ml. of dry pyridine was stirred at room temperature for six hours. The reaction mixture was poured into saturated brine and extracted three times with ether. The combined ether extracts were washed with brine, dried over anhydrous magnesium sulfate, filtered and concentrated at reduced pressure giving 9.3 g. of crude product. This material was chromatographed on 100 g. of silica gel. Elution with 9:1 to 1:2 benzene:ether mixtures afforded 9.0 g. of pale-yellow solid. Recrystallization from benzene-hexane furnished 8.2 g. of racemic 2-benzamido-7-oxa-3-thia-1-azaspiro[5.5]undec-1-ene.

UV: $\lambda_{max}^{EtOH}$ 245 m$\mu$ ($\epsilon$ 12000), 285 (24600); $\lambda_{max}^{0.1\ N\ HCl}$ 255 (25200).
IR: $\nu_{max}^{KBr}$ 3100–3300, 1605, 1555 cm.$^{-1}$; $\nu_{max}^{CHCl_3}$ 1550, 1595 cm.$^{-1}$.
NMR: $\delta_{TMS}^{CDCl_3}$ 8.19, 7.39, 3.73, 3.54, 2.72, 1.78 p.p.m.
MS: m/e 290 (M$^+$), 262 (M–28), 105 (base).

*Analysis.*—Calcd. for $C_{15}H_{18}N_2O_2S$ (percent): C, 62.05; H, 6.25; N, 9.65; S, 11.04. Found (percent): C, 61.88; H, 6.31; N, 9.43; S, 10.85.

EXAMPLE 21

The following compounds were prepared in a similar manner as that described in Example 20 from 2-amino-7-oxa-3-thia-1-azaspiro[5.5]undec-1-ene and the appropriate acid chloride.

Racemic 2-p-fluorobenzamido-7-oxa-3-thia-1-azaspiro[5.5]undec-1-ene

Colorless solid, M.P. 150.5–151.5° from ethanol or benzenehexane.

UV: $\lambda_{max}^{EtOH}$ 249 m$\mu$ ($\epsilon$ 11200), 290 (26300); $\lambda_{max}^{0.1\ N\ HCl}$ 213 (8840), 258 (23600).
IR: $\nu_{max}^{KBr}$ 3100–3300, 1610, 1555 cm.$^{-1}$.
NMR: $\delta_{TDM}^{CDCl_3}$ 12.75, 8.25, 7.07, 3.83, 3.67, 2.83, 1.90 p.p.m.
MS: m/e 308 (M$^+$), 280 (M–28), 123 (base).

*Analysis.*—Calcd. for $C_{15}H_{17}FN_2O_2S$ (percent): C, 58.42; H, 5.56; N, 9.08; S, 10.40. Found (percent): C, 58.38; H, 5.80; N, 8.93; S, 10.50.

This material gave a hydrobromide salt as colorless solid M.P. 178–180° from ethanol.

*Analysis.*—Calcd. for $C_{15}H_{17}FN_2O_2S \cdot HBr$ (percent): C, 46.28; H, 4.66; N, 7.19; S, 8.23. Found: C, 46.26; H, 4.70; N, 7.11; S, 8.40.

Racemic 2-p-bromobenzamido-7-oxa-3-thia-1-azaspiro[5.5]undec-1-ene

Colorless solid, M.P. 128.5–129° from benzene-hexane or ethanol.

UV: $\lambda_{max}^{EtOH}$ 257 m$\mu$ ($\epsilon$ 15100), 295 (30200); $\lambda_{max}^{0.1\ N\ HCl}$ 220 m$\mu$ ($\epsilon$ 10600), 267 (27000).
IR: $\nu_{max}^{KBr}$ 3100–3300, 1595, 1555 cm.$^{-1}$; $\nu_{max}^{CHCl_3}$ 1595, 1555 cm.$^{-1}$.
NMR: $\delta_{TMS}^{CDCl_3}$ 12.75, 8.10, 7.54, 3.62, 2.79, 1.84 p.p.m.
MS: m/e 368 (M$^+$), 340 (M–28), 144 (base).

*Analysis.*—Calcd. for $C_{15}H_{17}BrN_2O_2S$ (percent): C, 48.79; H, 4.64; N, 7.58; S, 8.68; Br, 21.68. Found (percent): C, 48.90; H, 4.75; N, 7.53; S, 8.99; Br, 21.33.

Racemic 2-p-methoxybenzamido-7-oxa-3-thia-1-azaspiro[5.5]undec-1-ene

Colorless solid, M.P. 104–107° from benzene-hexane.

UV: $\lambda_{max}^{EtOH}$ 221 m$\mu$ ($\epsilon$ 12250), 302 (35000), $\lambda_{max}^{0.1\ N\ HCl}$ 227 m$\mu$ ($\epsilon$ 15200), 257 (11500), 297 (22100).
IR: $\nu_{max}^{KBr}$ 3100–3300, 1605, 1555 cm.$^{-1}$.
NMR: $\delta_{TMS}^{CDCl_3}$ 12.75, 8.20, 6.89, 3.82, 3.58, 2.77, 1.83 p.p.m.
MS: m/e 320 (M$^+$), 292 (M–28), 111 (base).

*Analysis.*—Calcd. for $C_{16}H_{20}N_2O_3S$ (percent): C, 59.98; H, 6.29; N, 8.74; S, 10.00. Found (percent): C, 59.93; H, 6.33; N, 8.67; S, 9.74.

Racemic 2-p-chlorobenzamido-7-oxa-3-thia-1-azaspiro[5.5]undec-1-ene

Colorless solid, M.P. 95–96.5° from ethanol.

UV: $\lambda_{max}^{EtOH}$ 242 m$\mu$ ($\epsilon$ 10800), 283 (22200); $\lambda_{max}^{0.1\ N\ HCl}$ 252 m$\mu$ ($\epsilon$ 22300).
IR: $\nu_{max}^{KBr}$ 3100–3300, 1605, 1555 cm.$^{-1}$.
Raman: (4880 A., powder) $\nu_{max}$ 1607, 1563, 1535 cm.$^{-1}$
NMR: $\delta_{TMS}^{CDCl_3}$ 8.05, 7.20, 3.74, 3.52, 2.76, 1.78 p.p.m.
MS: m/e 308 (M$^+$), 280 (M–28), 123 (base).

*Analysis.*—Calcd. for $C_{15}H_{17}FN_2O_2S$ (percent): C, 58.42; H, 5.56; N, 9.08; S, 10.40. Found (percent): C, 58.11; H, 5.49; N, 9.21; S, 10.57.

Racemic 2-p-chlorobenzamida-7-oxa-3-thia-1-azaspiro[5.5]undec-1-ene

Pale-yellow solid, M.P. 128.5–130° from ethanol.

UV: $\lambda_{max}^{EtOH}$ 253 m$\mu$ ($\epsilon$ 14220), 293 (28400); $\lambda_{max}^{0.1\ N\ HCl}$ 216 m$\mu$ ($\epsilon$ 9900), 264 (25420).
IR: $\nu_{max}^{KBr}$ 3100–3300, 1605, 1555 cm.$^{-1}$.
NMR: $\delta_{TMS}^{CDCl_3}$ 8.13, 7.32, 3.71, 3.52, 2.72, 1.26 p.p.m.
MS: m/e 324 (M$^+$), 296 (M–28), 144 (base).

*Analysis.*—Calcd. for $C_{15}H_{17}ClN_2O_2S$ (percent): C, 55.46; H, 5.28; N, 8.62; S, 9.87. Found (percent): C, 55.50; H, 5.20; N, 8.56; S, 10.15.

Racemic 2-(1-adamantanylcarboxamido-7-oxa-3-thia-1-azaspiro[5.5]undec-1-ene

Colorless solid, M.P. 158–160° from ethanol.

UV: $\lambda_{max}^{EtOH}$ 237 m$\mu$ ($\epsilon$ 7000), 270 (18000); $\lambda_{max}^{0.1\ N\ HCl}$ 230 m$\mu$ ($\epsilon$ 15150), $\lambda_{Sh}^{0.1\ N\ HCl}$ 245 (12620).
IR: $\nu_{max}$ 3100–3400, 1585, 1555 cm.$^{-1}$.
Raman: (4880 A., powder); $\nu_{max}$ 1575 cm$^{-1}$.
NMR: $\lambda_{TMS}^{CDCl_3}$ 3.73, 3.43, 2.74, 1.8 p.p.m.

MS: m/e 348 (M$^+$), 320 (M–28), 213, 135, 111.

*Analysis.*—Calcd. for $C_{19}H_{28}N_2O_2S$ (percent): C, 65.48; H, 8.09; N, 8.04; S, 9.20. Found (percent): C, 65.56; H, 8.14; N, 7.98; S, 9.17.

Racemic 2-cinnamamido-7-oxa-3-thia-1-azaspiro[5.5]undec-1-ene

Pale-yellow, viscous oil which was converted to the hydrochloride and off-white solid, M.P. 177.5–179° from ethanol.

UV: $\lambda_{max}^{EtOH}$ 223 m$\mu$ ($\epsilon$ 14700), 311 (37000).
IR: $\nu_{max}^{KBr}$ 2400–3250, 1710, 1630, 1595, 1570 cm.$^{-1}$.
NMR: $\delta_{TMS}^{CDCl_3}$ 7.95, 6.79, 7.60, 7.43, 3.80, 3.53, 2.85, 1.45–2.66 p.p.m.

*Analysis.*—Calcd. for $C_{17}H_{20}N_2O_2S \cdot HCl$ (percent): C, 57.86; H, 6.00; N, 7.94; S, 9.08. Found (percent): C, 57.67; H, 5.79; N, 7.77; S, 9.06.

EXAMPLE 22

A solution of 5 g. (0.0308 mole) of 1,1'-carbonyl diimidazole in 15 ml. of dry tetrahydrofuran was stirred at room temperature while a solution of 3.1 g. (0.03 mole) of ethoxyacetic acid in 5 ml. of dry tetrahydrofuran was added. Gas was evolved and the resulting solution was stirred for one hour. A slurry of 5.6 g. (0.03 mole) of 2-amino-7-oxa-3-thia - 1 - azaspiro[5.5]undec-1-ene in 60 ml. of dry tetrahydrofuran was then added in five minutes and the resulting mixture was stirred at room temperature for 18 hours.

After treatment with 60 ml. of water and 200 ml. of saturated brine, the organic material was extracted three times with methylene chloride. The combined organic extracts were washed once with brine, dried over anhydrous magnesium sulfate, filtered and concentrated at reduced pressure. This gave 8.1 g. of crude, pale-yellow oily product.

A 7 g. sample of this material was chromatographed on 200 g. of silica gel. Elution with 1:1 benzene:ether to 4:1 ether:ethyl acetate gave 5.4 g. of yellow oily racemic 2 - ethoxyacetamido - 7 - oxa-3-thia-1-azaspiro[5.5]undec-1-ene;

IR: $\nu_{max.}^{film}$ 3100–3400, 1700, 1600, 1555 cm.$^{-1}$.

A solution of this material is 30 ml. of ethyl acetate was added to 2.3 g. of maleic acid dissolved in 50 ml. of ethyl acetate and the resulting solution was concentrated at reduced pressure. The white solid residue was recrystallized from ethyl acetate giving 6 g. of fluffy, white solid maleate, M.P. 96–97.5°.

UV: $\lambda_{max.}^{EtOH}$ 212 m$\mu$ ($\epsilon$ 20550), 266 (15620).

NMR: $\delta_{TMS}^{CDCl_3}$ 6.34, 4.20, 3.59, 2.90, 2.40, 1.83, 1.23 p.p.m.

*Analysis.*—Calcd. for $C_{12}H_{20}N_2O_3S\cdot C_4H_4O_4$ (percent): C, 49.48; H, 6.23; N, 7.21; S, 8.25. Found (percent): C, 49.68; H, 6.34; N, 7.21; S, 8.28.

EXAMPLE 23

Racemic 2-phenylacetamido-7-oxa - 3 - thia-1-azaspiro [5.5]undec-1-ene was prepared from 2-amino-7-oxa-3-thia-1-azaspiro[5.5]undec-1-ene and phenylacetic acid using the procedure described in Example 22. The free base was a pale-yellow oil.

IR: $\nu_{max.}^{film}$ 3100–3400, 1710, 1600, 1550 cm.$^{-1}$.

The maleate was a colorless solid, M.P. 101–102° from ethyl acetate.

UV: $\lambda_{max.}^{EtOH}$ 209 m$\mu$ ($\epsilon$ 28050), 267 (16500).

NMR: $\delta_{TMS}^{CDCl_3}$ 7.30, 6.34, 3.86, 3.74, 3.46, 2.85, 1.54–2.58 p.p.m.

*Analysis.*—Calcd. for $C_{16}H_{20}N_2O_2S\cdot C_4H_4O_4$ (percent): C, 57.13; H, 5.75; N, 6.66; S, 7.62. Found (percent): C, 57.36; H, 5.73; N, 6.65; S, 7.72.

EXAMPLE 24

A solution of 1 g. (5.35 mmoles) of 2-amino-7-oxa-3-thia-1-azaspiro[5.5]undec - 1 - ene and 0.675 g. (5.65 mmoles) of phenyl isocyanate in 20 ml. of methylene chloride was stirred at room temperature for 1.5 hours then concentrated to dryness at reduced pressure. This material was triturated with benzene to give 1.4 g. of light brown solid. Two recrystallizations from methanol gave tan crystals of racemic 2-(3-phenyl)ureido-7-oxa-3-thia-1-azaspiro[5.5]undec-1-ene, M.P. 177–178°.

UV: $\lambda_{max.}^{EtOH}$ 277 m$\mu$ ($\epsilon$ 20000); $\lambda_{max.}^{0.1\ N\ HCl}$ 247 m$\mu$ ($\epsilon$ 17820).

IR: $\nu_{max.}^{CHCl_3}$ 3425, 3100–3400, 1700, 1625, 1575, 1510, 1440, cm.$^{-1}$.

MS: m/e 305 (M$^+$), 213, 186, 158, 119 (base), 111.

*Analysis.*—Calcd. for $C_{15}H_{19}N_3O_2S$ (percent): C, 58.99; H, 6.27; N, 13.76; S, 10.50. Found (percent): C, 58.94; H, 6.26; N, 13.77; S, 10.37.

EXAMPLE 25

A solution of 1 g. (5.38 mmoles) of 2-amino-7-oxa-3-thia-1-azaspiro[5.5]undec-1-ene and 0.81 g. (5.45 mmoles) of phthalic anhydride in 15 ml. of dry pyridine was stirred at room temperature for 5 hours then poured into saturated brine. The mixture was extracted three times with ether and the combined extracts were washed once with brine, dried over anhydrous magnesium sulfate, filtered and concentrated at reduced pressure.

The residue (0.9 g.) was chromatographed on 50 g. of silica gel. Elution with 4:1 and 1:1 benzene:ether afforded 0.55 g. of pure racemic 2-phthalimido-7-oxa-3-thia-1-azaspiro[5.5]undec-1-ene as a colorless solid. Two recrystalliaztions from benzene-hexane gave 0.474 g. of colorless solid, M.P. 166–167.5°.

UV: $\lambda_{max.}^{EtOH}$ 220 m$\mu$ ($\epsilon$ 49000), 293 (2435); $\lambda_{sh.}^{EtOH}$ 238 m$\mu$ ($\epsilon$ 14000), 301 (2100).

IR: $\nu_{max.}^{CHCl_3}$ 1790, 1730, 1610, 1625 cm.$^{-1}$:

NMR: $\delta_{TMS}^{CDCl_3}$ 7.81, 4.22, 3.67, 3.22, 1.74 p.p.m.

MS: m/e 316 (M$^+$), 288 (M-28), 144 (base).

*Analysis.*—Calcd. for $C_{16}H_{16}N_2O_3S$ (percent): C, 60.74; H, 5.10; N, 8.85; S, 10.13. Found (percent): C, 60.51; H, 4.82; N, 8.56; S, 10.01.

This material could also be prepared in a similar manner by treatment of 2-amino-7-oxa-3-thia-1-azaspiro[5.5] undec-1-ene with phthaloyl chloride.

EXAMPLE 26

A slurry of 0.624 g. (0.013 mole) of 50% sodium hydride-mineral dispersion in 12 ml. of dry dimethylformamide (DMF) was stirred with ice-bath cooling while a solution of 2.7 g. (0.0118 mole) of 2-acetamido-7-oxa-3-thia-1-azaspiro[5.5]undec-1-ene in 30 ml. of dry DMF was added dropwise over a 10 min. period. Hydrogen was evolved and the mixture was stirred for 10 min. at 0–5° then for 1 hour at room temperature.

The reaction mixture was once again cooled in an ice bath while 1.45 ml. (0.0125 mole) of benzyl chloride in 15 ml. of DMF was added over 5 min. The ice bath was removed and the slurry was stirred at room temperature for 4 hours before addition of 3 ml. of water. The resulting solution was concentrated to dryness at reduced pressure and the residue was taken up in ether and washed three times with 3 N aqueous hydrochloric acid. The acidic washes were combined and extracted once with ether. The ether extracts were discarded.

The acidic extracts were made alkaline with 10% aqueous sodium hydroxide solution then extracted three times with ether. The ether extracts were combined, washed with brine, dried and filtered. Solvent removal gave 2.96 g. of yellow oily product which contained 2-(N-benzylacetamido)-7-oxa-3-thia-1-azaspiro[5.5]undec-1-ene.

This material was stirred and refluxed with 25 ml. of 2 N aqueous hydrochloric acid for 2 hrs. After cooling, the mixture was made alkaline with 10% sodium hydroxide solution and extracted three times with methylene chloride. The combined methylene chloride extracts were washed once with brine, dried over anhydrous magnesium sulfate, filtered and concentrated at reduced pressure. This gave 2.5 g. of crude, crystalline rac. 2-benzylamino-7-oxa-3-thia-1-azaspiro[5.5]undec - 1 - ene. Recrystallization from ethanol furnished 1.682 g. of colorless crystals, M.P. 94–95°.

The analytical specimen was a colorless solid, M.P. 94.5–95.5° (from ethanol).

UV: $\lambda_{max.}^{EtOH}$ 216 m$\mu$ ($\epsilon$ 18000).

IR: $\nu_{max.}^{CHCl_3}$ 3430, 1630 cm.$^{-1}$.

NMR: $\delta_{TMS}^{CDCl_3}$ 7.34, 4.50, 4.12, 3.56, 3.08, 1.71 p.p.m.

MS: m/e 276 (M$^+$), 248 (M-28)

*Analysis.*—Calcd. for $C_{15}H_{20}N_2OS$ (percent): C, 65.18; H, 7.29; N, 10.13; S, 11.60. Found (percent): C, 65.51; H, 7.31; N, 10.12; S, 11.69.

EXAMPLE 27

Racemic 2 - methylamino-7-oxa-3-thia-1-azaspiro[5.5]undec-1-ene was prepared by the procedure used in Example 26 starting from 2-acetamido-7-oxa-3-thia-1-azaspiro[5.5]undec-1-ene and methyl iodide. The product was a colorless solid, M.P. 107.5–109° from ethanol.

UV: $\lambda_{\text{infl.}}^{\text{EtOH}}$ 210 m$\mu$ ($\epsilon$ 10000).
IR: $\nu_{\text{max}}^{\text{CHCl}_3}$ 3450, 1630 cm.$^{-1}$.
NMR: $\delta_{\text{TMS}}^{\text{CDCl}_3}$ 4.20, 3.91, 3.57, 3.06, 2.83, 1.77 p.p.m.
MS: m/e 200 (M+), 172 (M–28, base peak).

*Analysis.*—Calcd. for $C_9H_{16}N_2OS$ (percent): C, 53.97; H, 8.05; N, 13.98; S, 16.00. Found (percent): C, 54.14; H, 8.01; N, 14.04; S, 15.91.

EXAMPLE 28

A solution of 3 g. (0.0149 mole) of 2-(diethylaminoethyl)-tetrahydropyran-2-ol, 2.28 g. (0.015 mole) of phenylthiourea, 15 ml. of glacial acetic acid and 50 ml. of toluene was stirred and heated at reflux for 18 hours using a Dean-stark trap to remove water. The solution was then concentrated to dryness at reduced pressure. The residue was treated with ether and washed three times with dilute aqueous hydrochloric acid. The acid extracts were combined and washed once with ether. The ether extracts were discarded.

The aqueous acid solution was made alkaline with 10% aqueous sodium hydroxide solution and extracted three times with methylene chloride. The combined organic extracts were dried over anhydrous sodium sulfate, filtered and concentrated at reduced pressure giving 2.1 g. of red gum.

This material was chromatographed on 100 g. of silica gel. The fractions eluted with 9:1 benzene:ether afforded 0.922 g. of yellow semi-crystalline material rich in the desired product.

A sample of this material was recrystallized twice from benzene-hexane giving rac. 2-phenylamino-7-oxa-3-thia-1-azaspiro[5.5]undec-1-ene (alternatively named as the tautomer, rac. 2-phenylimino-7-oxa-3-thia-1-azaspiro[5.5]undecane, M.P. 103–104.5°.

UV: $\lambda_{\text{max}}^{\text{EtOH}}$ 261 m$\mu$ ($\epsilon$ 12700); $\lambda_{\text{max}}^{0.1\,N\,\text{HCl}}$ 226 m$\mu$ ($\epsilon$ 13000).
IR: $\nu_{\text{max}}^{\text{CHCl}_3}$ 3400, 1585 cm.$^{-1}$; $\nu_{\text{sh.}}^{\text{CHCl}_3}$ 1640, 1600 cm.$^{-1}$.
NMR: $\delta_{\text{TMS}}^{\text{CDCl}_3}$ 7.18, 3.95, 3.65, 3.32, 2.74, 1.72 p.p.m.
MS: m/e 262 (M+), 234 (M–28), 111.

*Analysis.*—Calcd. for $C_{14}H_{18}N_2OS$ (percent): C, 64.09; H, 6.91; N, 10.68; S, 12.22. Found (percent): C, 63.86; H, 6.84; N, 10.54; S, 12.37.

EXAMPLE 29

The following compounds were prepared from 2-amino-7-oxa-3-thia-1-azaspiro[5.5]undec-1-ene and either the appropriate acid chloride according to the method of Example 20 or the appropriate acid according to the carbonyldiimidazole method of Example 22:

Racemic 2-(3-trifluoromethylbenzamido)-7-oxa-3-thia-1-azaspiro[5.5]undec-1-ene (acid chloride method)

Colorless solid, M.P. 101–102° (crystallized from ethanol).

UV: $\lambda_{\text{max}}^{\text{EtOH}}$ 241 m$\mu$ ($\epsilon$ 11200), 292 (23000); $\lambda_{\text{max}}^{0.1\,N\,\text{HCl}}$ 250 m$\mu$ ($\epsilon$ 23500).
IR: $\nu_{\text{max}}^{\text{KBr}}$ 3100–3400, 1620, 1605, 1560 cm.$^{-1}$.
NMR: $\delta_{\text{TMS}}^{\text{CDCl}_3}$ 8.40, 7.54, 3.73, 3.56, 2.75, 1.80, p.p.m.
MS: m/e 358 (M+), 330 (M–28), 173, 144 (base), 111.

*Analysis.*—Calcd. for $C_{16}H_{17}F_3N_2O_2S$ (percent): C, 53.62; H, 4.78;; N, 7.82; S, 8.95. Found (percent): C, 53.93; H, 4.89; N, 7.78; S, 9.19.

Racemic 2-m-fluorobenzamido-7-oxa-3-thia-1-azaspiro[5.5]undec-1-ene (carbonyldiimidazole method)

Colorless solid, M.P. 85–86° (crystallized from ethanol).

UV: $\lambda_{\text{max}}^{\text{EtOH}}$ 245 m$\mu$ ($\epsilon$ 11400), 285 (23800); $\lambda_{\text{max}}^{0.1\,N\,\text{HCl}}$ 255 m$\mu$ ($\epsilon$ 24400).
IR: $\nu_{\text{max}}^{\text{KBr}}$ 3100–3400, 1610, 1555 cm.$^{-1}$.
NMR: $\delta_{\text{TMS}}^{\text{CDCl}_3}$ 12.70, 7.93, 7.29, 3.75, 3.60, 2.76, 1.80 p.p.m.
MS: m/e 308 (M+), 280 (M–28), 144, 123, 111 (base).

*Analysis.*—Calcd. for $C_{15}H_{17}FN_2O_2S$ (percent): C, 58.42; H, 5.56; N, 9.08; S, 10.40. Found (percent): C, 58.71; H, 5.70; N, 9.09; S, 10.28.

Racemic 2-o-chlorobenzamido-7-oxa-3-thia-1-azaspiro[5.5]undec-1-ene (acid chloride method)

Colorless solid, M.P. 115.5–117° (crystallized from ethanol).

UV: $\lambda_{\text{max}}^{\text{EtOH}}$ 245 m$\mu$ ($\epsilon$ 9120), 287 (20500); $\lambda_{\text{max}}^{0.1\,N\,\text{HCl}}$ 253 m$\mu$ ($\epsilon$ 18600).
IR: $\nu_{\text{max}}^{\text{KBr}}$ 3100–3400, 1600, 1585, 1550 cm.$^{-1}$.
NMR: $\delta_{\text{TMS}}^{\text{CDCl}_3}$ 7.82, 7.32, 3.78, 3.55, 2.77, 1.80 p.p.m.
MS: m/e 324 (M+), 111 (base).

*Analysis.*—Calcd. for $C_{15}H_{17}ClN_2O_2S$ (percent): C, 55.47; H, 5.28; N, 8.62; S, 9.87. Found (percent): C, 55.56; H, 5.25; N, 8.60; S, 10.03.

Racemic 2-(2,4,6-trimethylbenzamido)-7-oxa-3-thia-1-azaspiro[5.5]undec-1-ene (acid chloride method)

Colorless solid, M.P. 120–121.5° (recrystallized from acetonitrile).

UV: $\lambda_{\text{max}}^{\text{EtOH}}$ 272 m$\mu$ ($\epsilon$ 17220); $\lambda_{\text{max}}^{0.1\,N\,\text{HCl}}$ 220 m$\mu$ ($\epsilon$ 17220), 251 (14800).
IR: $\nu_{\text{max}}^{\text{KBr}}$ 3100, 3200, 1650, 1620, 1530 cm.$^{-1}$.
NMR: $\delta_{\text{TMS}}^{\text{CDCl}_3}$ 6.82, 3.78, 3.45, 2.80, 2.30, 2.25, 1.75 p.p.m.
MS: m/e 332 (M+), 317, 304, (M–28), 147 (base), 111.

*Analysis.*—Calcd. for $C_{18}H_{24}N_2O_2S$ (percent): C, 65.03; H, 7.28; N, 8.43; S, 9.64. Found (percent): C, 65.12; H, 7.29; N, 8.53; S, 9.44.

Racemic 2-p-nitrobenzamido-7-oxa-3-thia-1-azaspiro[5.5]undec-1-ene (acid chloride method)

Pale-yellow solid, M.P. 170.5–172° (crystallized from acetonitrile).

UV: $\lambda_{\text{max}}^{\text{EtOH}}$ 244 m$\mu$ ($\epsilon$ 12800), 301 (22000); $\lambda_{\text{max}}^{0.1\,N\,\text{HCl}}$ 265 m$\mu$ ($\epsilon$ 26050).
IR: $\nu_{\text{max}}^{\text{KBr}}$ 3100–3300, 1580, 1555 cm.$^{-1}$.
NMR: $\delta_{\text{TMS}}^{\text{CDCl}_3}$ 12.72, 8.31, 3.80, 3.64, 2.80, 1.85 p.p.m.
MS: m/e 335 (M+), 307 (M–28), 150, 114, 111.

*Analysis.*—Calcd. for $C_{15}H_{17}N_3O_4S$ (percent): C, 53.72; H, 5.11; N, 12.53; S, 9.56. Found (percent): C, 53.50; H, 4.99; N, 12.64; S, 9.62.

Racemic 2-(3,4,5-trimethoxybenzamido)-7-oxa-3-thia-1-azaspiro[5.5]undec-1-ene (acid chloride method)

Colorless solid, M.P. 142.5–143.5° (crystallized from ethanol).

UV: $\delta_{\text{max}}^{\text{EtOH}}$ 298 m$\mu$ ($\epsilon$ 25400); $\lambda_{\text{max}}^{0.1\,N\,\text{HCl}}$ 296 m$\mu$ ($\epsilon$ 13400).
IR: $\nu_{\text{max}}^{\text{KBr}}$ 3100–3400, 1555 cm.$^{-1}$.
NMR: $\delta_{\text{TMS}}^{\text{CDCl}_3}$ 12.66, 7.52, 3.92, 3.90, 3.78, 3.60, 2.75, 1.82 p.p.m.
MS: m/e 380 (M+), 195 (base), 144, 111.

*Analysis.*—Calcd. for $C_{18}H_{24}N_2O_5S$ (percent): C, 56.83; H, 6.36; N, 7.36; S, 8.43. Found (percent): C, 56.86; H, 6.35; N, 7.30; S, 8.63.

Racemic 2-(3,4-dimethoxybenzamido)-7-oxa-3-thia-1-azaspiro[5.5]undec-1-ene (carbonyldiimidazole method)

Colorless solid, M.P. 129.5–131° (crystallized from ethanol).

UV: $\lambda_{max.}^{EtOH}$ 231 m$\mu$ ($\epsilon$ 14550), 286 (18450), 313 (22700); $\lambda_{max.}^{0.1\,N\,HCl}$ 235 (19700), 286 (11200), 315 (13150).
IR: $\nu_{max.}^{KBr}$ 3100–3300, 1605, 1550 cm.$^{-1}$.
NMR: $\delta_{TMS}^{CDCl_3}$ 12.75, 7.83, 6.96, 3.92, 3.77, 3.59, 2.73, 1.80 p.p.m.
MS: m/e 350 (M$^+$), 322 (M–28), 165 (base), 144, 111.
Analysis.—Calcd. for $C_{17}H_{22}N_2O_4S$ (percent): C, 58.27; H, 6.33; N, 7.99; S, 9.15. Found (percent): C, 58.38; H, 6.39; N, 7.96; S, 9.28.

Racemic 2-p-cyanobenzamido-7-oxa-3-thia-1-azaspiro [5.5]undec-1-ene (acid chloride method)

Colorless solid, M.P. 170.5–172° (crystallized from acetonitrile).

UV: $\lambda_{max.}^{EtOH}$ 248 m$\mu$ ($\epsilon$ 17900), 292 (24300); $\lambda_{max.}^{0.1\,N\,HCl}$ 255 m$\mu$ ($\epsilon$ 31000).
IR: $\nu_{max.}^{KBr}$ 3100–3400, 2225, 1595, 1555 cm.$^{-1}$.
NMR: $\delta_{TMS}^{CDCl_3}$ 13.07, 8.56, 7.69, 3.77, 3.58, 2.75, 1.82 p.p.m.
MS: m/e 315 (M$^+$), 287 (M–28), 144, 111 (base).
Analysis.—Calcd. for $C_{16}H_{17}N_3O_2S$ (percent): C, 61.01; H, 5.44; N, 13.34; S, 10.18. Found (percent): C, 60.86; H, 5.41; N, 13.29; S, 10.19.

Racemic 2-p-n-butoxybenzamido-7-oxa-3-thia-1-azaspiro- [5.5]undec-1-ene (carbonyldiimidazole method)

Colorless solid, M.P. 108–109° (crystallized from ethanol).

UV: $\lambda_{max.}^{EtOH}$ 220 m$\mu$ ($\epsilon$ 11900), 302 (35200); $\lambda_{max.}^{0.1\,N\,HCl}$ 228 ($\epsilon$ 15200), 256 (10900), 299 (22600).
IR: $\nu_{max.}^{KBr}$ 3100–3400, 1605, 1585, 1550 cm.$^{-1}$.
NMR: $\delta_{TMS}^{CDCl_3}$ 12.80, 8.14, 6.86, 3.97, 3.74, 3.54, 2.72, 1.77, 0.96 p.p.m.
MS: m/e 362 (M$^+$) 334 (M–28), 144 (base), 111.
Analysis.—Calcd. for $C_{19}H_{26}N_2O_3S$ (percent): C, 62.96; H, 7.23; N, 7.73; S, 8.84. Found (percent): C, 63.06; H, 7.30; N, 7.72; S, 8.98.

Racemic 2-p-methylbenzamido-7-oxa-3-thia-1-azaspiro- [5.5]undec-1-ene (acid chloride method)

Colorless solid, M.P. 173.5–175° (crystallized from ethanol).

UV: $\lambda_{max.}^{EtOH}$ 257 m$\mu$ ($\epsilon$ 12000), 292 (27250); $\lambda_{max.}^{0.1\,N\,HCl}$ 220 m$\mu$ ($\epsilon$ 9300), 267 (23150).
IR: $\nu_{max.}^{KBr}$ 3100–3400, 1595, 1555 cm.$^{-1}$.
NMR: $\lambda_{TMS}^{CDCl_3}$ 8.05, 7.27, 3.78, 3.60, 2.74, 2.38, 1.80 p.p.m.
MS: m/e 304 (M$^+$), 276 (M–28), 144, 119 (base), 111.
Analysis.—Calcd. for $C_{16}H_{20}N_2O_2S$ (percent): C, 63.22; H, 6.63; N, 9.21; S, 10.55. Found (percent): C, 63.42; H, 6.57; N, 9.42; S, 10.51.

Racemic 2-(3-carbomethoxypropionamido)-7-oxa-3-thia- 1-azaspiro[5.5]undec-1-ene (acid chloride method)

Colorless solid, M.P. 94.5–95.5° (crystallized from ethanol).

UV: $\lambda_{max.}^{EtOH}$ 225 m$\mu$ ($\epsilon$ 6300), 238 (6900), 265 (16000); $\lambda_{max.}^{0.1\,N\,HCl}$ 226 m$\mu$ ($\epsilon$ 11620), 247 (12750).
IR: $\nu_{max.}^{KBr}$ 3100–3400, 1740, 1555 cm.$^{-1}$.
NMR: $\delta_{TMS}^{CDCl_3}$ 3.36, 3.48, 2.68, 1.50–2.34 p.p.m.
MS: m/e 300 (M$^+$), 272 (M–28), 144, 111 (base).
Analysis.—Calcd. for $C_{13}H_{20}N_2O_4S$ (percent): C, 51.98; H, 6.71; N, 9.33; S, 10.67. Found (percent): C, 51.98; H, 6.96; N, 9.16; S, 10.83.

Racemic 2-(2,6-dichlorobenzamido)-7-oxa-3-thia-1-aza- spiro[5.5]undec-1-ene (acid chloride method)

Colorless solid, M.P. 182.5–184° (crystallized from ethanol)

UV: $\lambda_{max.}^{EtOH}$ 273 m$\mu$ ($\epsilon$ 22100); $\lambda_{max.}^{0.1\,N\,HCl}$ 220 m$\mu$ ($\epsilon$ 17400) 254 (14300).
IR: $\nu_{max.}^{KBr}$ 3100–3400, 1590, 1550 cm.$^{-1}$.
NMR: $\delta_{TMS}^{CDCl_3}$ 12.20, 7.23, 3.80, 3.57, 2.80, 1.82 p.p.m.
MS: m/e 358 (M$^+$), 330 (M–28), 293, 173, 144, 111 (base).
Analysis.—Calcd. for $C_{15}H_{16}Cl_2N_2O_2S$ (percent): C, 50.19; H, 4.49; N, 7.80; S, 8.93. Found (percent): C, 50.31; H, 4.57; N, 7.78; S, 8.93.

Racemic 2-o-Methylbenzamido-7-oxa-3-thia-1-azaspiro- [5.5]undec-1-ene (acid chloride method)

Colorless solid, M.P. 82–83° (crystallized from ethanol)

UV: $\lambda_{max.}^{EtOH}$ 250 m$\mu$ ($\epsilon$ 10600), 281 (20400); $\lambda_{max.}^{0.1\,N\,HCl}$ 256 m$\mu$ ($\epsilon$ 20650).
IR: $\nu_{max.}^{KBr}$ 3100–3400, 1605, 1590, 1560 cm.$^{-1}$.
NMR: $\delta_{TMS}^{CDCl_3}$ 12.25, 7.88, 7.24, 3.77, 3.52, 2.75, 2.58, 1.79 p.p.m.
MS: m/e 304 (M$^+$), 276 (M–28), 144, 111 (base).
Analysis.—Calcd. for $C_{16}H_{20}N_2O_2S$ (percent): C, 63.14; H, 6.62; N, 9.21; S, 10.54. Found (percent): C, 63.01; H, 6.79; N, 9.24; S, 10.81.

Racemic 2-(2-furoamido)-7-oxa-3-thia-1-azaspiro-[5.5] undec-1-ene (acid chloride method)

Colorless solid, M.P. 101–103° (crystallized from ethanol).

UV: $\lambda_{max.}^{EtOH}$ 268 m$\mu$ ($\epsilon$ 9900), 303 (33800), $\lambda_{max.}^{0.1\,N\,HCl}$ 235 m$\mu$ ($\epsilon$ 8800), 258 (10600), 291 (25800).
IR: $\nu_{max.}^{KBr}$ 3100–3400, 1610, 1555 cm.$^{-1}$.
NMR: $\delta_{TMS}^{CDCl_3}$ 1.240, 7.55, 7.23, 6.52, 3.75, 3.58, 2.67, 1.78 p.p.m.
MS: m/e 280 (M$^+$), 252 (M–28), 144, 111 (base), 95.
Analysis.—Calcd. for $C_{13}H_{16}N_2O_3S$ (percent): C, 55.71; H, 5.75; N, 10.00; S, 11.44. Found (percent): C, 56.00; H, 5.75; N, 10.02; S, 11.52.

Racemic 2-(2-thenoamido)-7-oxa-3-thia-1-azaspiro- [5.5]undec-1-ene (carbonyldiimidazole method Colorless solid, M.P. 115–116° (recrystallized from ethanol).

UV: $\lambda_{max.}^{EtOH}$ 262 m$\mu$ ($\epsilon$ 12700), 271 (11700), 307 (26200), $\lambda_{max.}^{0.1\,N\,HCl}$ 274 m$\mu$ ($\epsilon$ 15000), 298 (15800).
IR: $\nu_{max.}^{KBr}$ 3100–3400, 1575, 1560, 1520 cm.$^{-1}$.
NMR: $\delta_{TMS}^{CDCl_3}$ 12.50, 7.82, 7.49, 7.05, 3.75, 3.57, 2.75, 1.77 p.p.m.
MS: m/e 296 (M$^+$), 268 (M–28), 144, 111 (base).
Analysis.—Calcd. for $C_{13}H_{16}N_2O_2S_2$ (percent): C, 52.70; H, 5.44; N, 9.46; S, 21.63. Found (percent): C, 52.41; H, 5.38; N, 9.44; S, 21.32.

Racemic 2-trimethylacetamido-7-oxa-3-thia-1-azaspiro [5.5]undec-1-ene (acid chloride method)

Colorless solid, M.P. 124.5–125.5° (crystallized from ethanol)

UV: $\lambda_{max.}^{EtOH}$ 235 m$\mu$ ($\epsilon$ 7350), 268 (17200); $\lambda_{max.}^{0.1\,N\,HCl}$ 227 (12950), 246 (11200).
IR: $\nu_{max.}^{KBr}$ 3100–3400, 1585, 1560 cm.$^{-1}$.
NMR: $\delta_{TMS}^{CDCl_3}$ 3.67, 3.40, 2.70, 1.73, 1.17 p.p.m.
Analysis.—Calcd. for $C_{13}H_{22}N_2O_2S$ (percent): C, 57.75; H, 8.20; N, 10.36; S, 11.86. Found (percent), C, 57.50; H, 8.24; N, 10.31; S, 11.71.

Racemic 2-m-nitrobenzamido-7-oxa-3-thia-1-azaspiro- [5.5]undec-1-ene (acid chloride method)

Pale-yellow solid, M.P. 126–127°.
Analysis.—Calcd. for $C_{15}H_{17}N_3O_4S$ (percent): C, 53.72; H, 5.11; N, 12.53; S, 9.56. Found (percent): C, 53.87; H, 5.07; N, 12.70; S, 9.73.

Racemic 2 - (4 - dimethylaminobenzamido) - 7 - oxo-3-thia - 1 - azaspiro[5.5]undec - 1 - ene (carbonyldiimidazole method)

Yellow solid, M.P., 164.5–165.5°.

*Analysis.*—Calcd. for $C_{19}H_{20}N_2O_2S$ (percent): C, H, 6.95; N, 12.60; S, 9.62. Found (percent): C, 61.29; H, 6.89; N, 12.76; S, 9.87.

Racemic 2-(1-naphthamido)-7-oxo-3-thia-1-azaspiro[5.5]undec-1-ene (carbonyldiimidazole method)

*Analysis.*—Calcd. for $C_{19}H_{20}N_2O_2S$ (percent): C, 67.03; H, 5.92; N, 8.23; S, 9.42. Found (percent): C, 67.34; H, 5.92; N, 8.23; S, 9.29.

Racemic 2-(2,4-dichlorobenzamido)-7-oxa-3-thia-1-azaspiro[5.5]undec-1-ene (acid chloride method)

Colorless solid, M.P. 88–89.5°.

*Analysis.*—Calcd. for $C_{15}H_{16}Cl_2N_2O_2S$ (percent): C, 50.15; H, 4.49; N, 7.80; S, 8.92. Found (percent): C, 50.12; H, 4.49; N, 7.83; S, 8.93.

Racemic 2-(4-phenylbenzamido)-7-oxa-3-thia-1-azaspiro[5.5]undec-1-ene (carbonyldiimidazole method)

Colorless solid, M.P. 147–148°.

*Analysis.*—Calcd. for $C_{21}H_{22}N_2O_2S$ (percent): C, 68.83; H, 6.05; N, 7.64; S, 8.75. Found (percent): C, 69.03; H, 6.05; N, 7.67; S, 8.73.

Racemic 2-nicotinamido-7-oxa-3-thia-1-azaspiro[5.5]undec-1-ene (carbonyldiimidazole method)

Colorless solid, M.P. 102.5–103.5°.

*Analysis.*—Calcd. for $C_{14}H_{17}N_3O_2S$ (percent): C, 57.71; H, 5.88; N, 14.42; S, 11.00. Found (percent): C, 57.96; H, 5.89; N, 14.64; S, 11.05.

EXAMPLE 30

To a cold (ice-bath) solution of 16.3 g. (0.14 mole) of crude 1 - hexen - 3,6 - diol, 530 ml. of 1,2 - dichloroethane (dried over anhydrous potassium carbonate), and 80 ml. (56.2 g. 0.77 mole) of diethylamine was added 154 g. of activated manganese dioxide in portions with efficient stirring. The mixture was stirred at 0–5° for one hour, then at room temperature for 18 hours.

The mixture was filtered with suction and the filter cake was washed thoroughly by slurrying several times in fresh dichloroethane and refiltering. The filtrate and washes were combined and concentrated at reduced pressure giving 22.7 g. of a red oil.

This material was treated with 150 ml. of ethyl acetate and 300 ml. of 1.2 N aqueous hydrochloric acid. After vigorous shaking, the aqueous layer was separated and extracted with 3–150 ml. portions of ethyl acetate.

The aqueous acidic solution was made alkaline (pH 12) with 100 ml. of 10 N aqueous sodium hdyroxide solution and extracted with 4–150 ml. portions of benzene. The benzene extracts were combined and washed twice with 50 ml. portions of brine then dried and concentrated at reduced pressure giving 10.2 g. of the Mannich base 6-diethylamino-hexan-4-on-1-ol [alternative nomenclature 2-(2-diethylaminoethyl)-tetrahydrofuran-2-ol] as a yellow oil.

IR: $\nu_{max.}^{CHCl_3}$ 3100 3400, 1715 cm.$^{-1}$.
NMR: $\delta_{TMS}^{CDCl_3}$ 5.17, 3.87, 2.62, 1.87, 1.07 p.p.m.
MS: m/e 187 (M+), 172 (M–15).

EXAMPLE 31

A mixture of 0.8 g. (4.3 mmoles) of Mannich base prepared as in the preceding example, 0.33 g. (4.3 mmoles) of thiourea, 13.5 ml. of toluene and 4.3 ml. of glacial acetic acid was stirred and heated at reflux for three hours. The resulting solution was concentrated at reduced pressure. The residue was chilled and treated with excess 10% aqueous sodium hydroxide solution and the alkaline mixture was extracted several times with methylene chloride. The extracts were combined, washed with brine, then dried, filtered and concentrated at reduced pressure giving 0.4 g. of pale-yellow crystalline residue. Recrystallization from acetonitrile gave the pure racemic 2-amino-7-oxa-3-thia-1-azaspiro[5.4]dec - 1 - ene as pale-yellow solid, M.P. 143–145°.

IR: $\nu_{max.}^{Nujol}$ 3300, 3350, 1650, 1590 cm.$^{-1}$.
NMR: $\delta_{TMS}^{CDCl_3}$ 4.46, 3.95, 3.08, 1.86 p.p.m.
MS: m/e 172 (M+), 144 (M–28) (base), 130, 97.

*Analysis.*—Calcd. for $C_7H_{12}N_2OS$ (percent): C, 48.81; H, 7.02; N, 16.26; S, 18.61. Found (percent): C, 48.65; H, 6.93; N, 16.01; S, 18.34.

EXAMPLE 32

A mixture of 25.2 g. (0.122 moles) of crude ethyl 7-chloro-5-oxoheptanoate, 15.5 g. (0.25 moles) of ethylene glycol, 0.25 g. of p-toluenesulfonic acid monohydrate and 200 ml. of benzene was stirred and heated at reflux for five hours. A Dean-Stark trap was used to collect water. The resulting mixture was cooled and washed with excess saturated aqueous sodium bicarbonate solution. The benzene layer was removed and the aqueous layer was extracted twice with ether. The organic solutions were combined, dried (Na$_2$SO$_4$), filtered and concentrated at reduced pressure giving 29.4 g. of crude, orange, oily ketal ester 7-chloro-5-oxoheptanoate ethylene ketal which was used without further purification.

IR: $\nu_{max.}^{film}$ 1740 cm.$^{-1}$.

EXAMPLE 33

A mixture of 5.7 g. (0.15 mole) of lithium aluminum hydride and 300 ml. of anhydrous ether was stirred with ice-bath cooling while a solution of the crude ester prepared as in Example 32 in 50 ml. of ether was added dropwise over 20 minutes. The ice bath was removed and the resulting gray-green mixture was stirred at room temperature for three hours then decomposed by cautious dropwise addition of 11.5 ml. of water and 9 ml. of 10% aqueous sodium hydroxide solution, again with ice bath cooling. After stirring at room temperature for 1.25 hours, the slurry was filtered with suction and the filter cake was washed thoroughly with fresh ether. The filtrate and washes were combined and concentrated at reduced pressure giving 23.4 g. of crude yellow, oily 2-(2-chloroethyl)-2-(4-hydroxybutyl)-1,3-dioxolane which was not purified further.

IR: $\nu_{max.}^{film}$ 3400 cm.$^{-1}$.

EXAMPLE 34

A mixture of 2 g. (9.6 mmoles) of the crude hydroxy ketal prepared as in Example 33, 5 ml. of 3 N aqueous sulfuric acid 15 ml. of water and 15 ml. of acetone was stirred at room temperature for three hours then poured into saturated brine. The organic materials were extracted three times with ether. The ether extracts were combined, washed once with brine then dried (MgSO$_4$), filtered and concentrated at reduced pressure giving 1.3 g. of yellow oily 7-chloroheptan-5-on-1-ol. This crude material was used without further purification.

IR: $\nu_{max.}^{film}$ 3400, 1715 cm.$^{-1}$.

EXAMPLE 35

The crude chloroketone prepared as in Example 34 was mixed with 1.2 ml. of triethylamine. A solid began to precipitate after a few minutes. The mixture was kept at room temperature for 2.5 hours, then diluted with ether. The solid was broken up, filtered with suction and washed well with ether. The filtrate and washes were combined and concentrated at reduced pressure giving 1.05 g.

of yellow oily hept-6-en-5-on-1-ol which was used immediately with no further purification.

IR: $\nu_{max}^{film}$ 3400, 1680, 1620 cm.$^{-1}$.

EXAMPLE 36

A solution of the crude vinyl ketone (7.9 mmoles), prepared as in Example 35, 0.6 g. (7.9 mmoles) of thiourea and 7 ml. of glacial acetic acid was stirred at room temperature for 18.5 hours then concentrated at aspirator pressure at 55°. The residue was treated with ether and extracted twice with 10 ml. of 1 N aqueous hydrochloric acid. The acid extracts were combined and washed with ether then made alkaline with 10% aqueous sodium hydroxide solution and saturated with salt.

The alkaline mixture was extracted three times with methylene chloride. The combined methylene chloride extracts were dried (MgSO$_4$), filtered and concentrated at reduced pressure giving 0.85 g. of yellow, crystalline racemic 2 - amino - 7-oxa-3-thia-1-azaspiro[5.5]undec-1-ene, identical with a sample prepared previously. Recrystallization from ethanol gave pale-yellow crystals, M.P. 136–139°.

EXAMPLES 37

A solution of 1.8 g. (0.01 mole) of crude methyl 6-chloro-4-oxohexanoate, 2.5 ml. of ethylene glycol, 2.5 ml. of trimethyl orthoformate, 0.1 ml. of concentrated sulfuric acid and 30 ml. of tetrahydrofuran was stirred at room temperature for 4.5 hours, then poured into excess saturated aqueous sodium bicarbonate solution. The resulting mixture was extracted three times with ether. The ether extracts were combined, washed once with brine, dried (MgSO$_4$), filtered and concentrated at reduced pressure giving 2.3 g. of crude methyl 6-chloro-4-oxohexanoate ethylene ketal.

IR: $\nu_{max}^{film}$ 1740 cm.$^{-1}$.

NMR: $\delta_{TMS}^{CDCl_3}$ 3.93, 3.67 p.p.m.

This material could also be prepared in comparable yield by the ethylene glycol, p-toluenesulfonic acid method in benzene with azeotropic water removal.

EXAMPLE 38

A solution of 7 ml. of sodium bis-2-methoxyethoxy aluminum hydride (70% solution in toluene) in 10 ml. of toluene was stirred with ice bath cooling while solution of 2.2 g. of the crude ketal ester prepared as in Example 37 in 10 ml. of toluene was added dropwise during 15 minutes. The resulting solution was stirred at room temperature for 1.75 hours then cautiously poured onto a mixture of ice and 10% aqueous sodium hydroxide solution. The resulting mixture was extracted three times with ether then the ether extracts were combined, dried (MgSO$_4$), filtered and concentrated at reduced pressure giving 1.2 g. of crude 2-(2-chloroethyl)-2-(3-hydroxypropyl)-1,3-dioxolane as a brown oil. This material was used with no further purification.

IR: $\nu_{max}^{film}$ 3400 cm.$^{-1}$.

This reduction could also be carried out in comparable yield using lithium aluminum hydride in ether in the usual manner.

EXAMPLE 39

A mixture of the crude hydroxy ketal (6.17 mmoles) prepared as in Example 38, 0.47 g. (6.17 mmoles) of thiourea, 6.2 ml. of glacial acetic acid, 0.2 ml. of water and 20 ml. of toluene was stirred at room temperature for 1.5 hours then at reflux for 2.75 hours. The resulting mixture was concentrated at reduced pressure and the residue was treated with ether and washed twice with dilute aqueous hydrochloric acid. The acid extracts were combined and washed again with ether.

The acid solution was made alkaline with potassium carbonate and extracted three times with methylene chloride. The methylene chloride extracts were combined, dried (MgSO$_4$) filtered and concentrated at reduced pressure giving 0.7 g. of yellow solid racemic 2-amino-7-oxa-3-thia-1-azaspiro[5.4]dec-1-ene. This material was dissolved in hot ethanol and treated with 0.47 g. maleic acid. Crystallization gave colorless maleate salt, M.P. 143–144°.

EXAMPLE 40

A mixture of 3.04 g. (0.08 mole) of lithium aluminum hydride and 360 ml. of dry ether was stirred with ice bath cooling while a solution of 9.1 g. (0.0535 mole) of methyl 6-oxo-7-octenoate in 40 ml. of ether was added dropwise over 25 minutes. The resulting mixture was stirred at 0–5° for 1 hour then for 2 hours at room temperature. After cautious decomposition by dropwise addition of 6 ml. of water and 4.8 ml. of 10% aqueous sodium hydroxide solution, in the cold, the mixture was stirred an additional 1 hour at room temperature. The solids were filtered and washed well with ether. The filtrate and washes were combined, dried (MgSO$_4$), refiltered and concentrated at reduced pressure giving 7.0 g. of yellow, oily 7-octen-1,6-diol was used without further purification.

IR: $\nu_{max}^{film}$ 3350, 920, 990 cm.$^{-1}$.

NMR: $\delta_{TMS}^{CDCl_3}$ 5.55–6.08, 5.12, 4.05, 3.57, 2.83, 1.43 p.p.m.

MS: m/e 144 (M$^+$), 57 (base).

EXAMPLE 41

A solution of the diol prepared in Example 40 (7 g.), 25.2 ml. of diethylamine and 186 ml. of 1,2-dichloroethane was stirred with ice bath cooling while 48.7 g. of activated manganese dioxide was added. The resulting mixture was stirred at room temperature for 19 hours then filtered and the solids were washed well with methylene chloride. The filtrate and washes were combined and concentrated at reduced pressure.

The residual oil was treated with 100 ml. of 1.2 N aqueous hydrochloric acid and extracted three times with ethyl acetate. The acid aqueous solution was made alkaline with sodium hydroxide solution and extracted four times with benzene. The benzene extracts were combined, washed with brine, dried (MgSO$_4$), filtered and concentrated at reduced pressure giving 2.4 g. oily 1-diethylamino-octan-3-on-8-ol.

IR: $\nu_{max}^{film}$ 3400, 1715 cm.$^{-1}$.
NMR: $\delta_{TMS}^{CDCl_3}$ 3.26, 2.53, 1.47, 1.02 p.p.m.
MS: m/e 215 (M$^+$), 100, 86.

EXAMPLE 42

A mixture of the Mannich base prepared as in Example 41 (2.4 g.), 0.88 g. (0.0116 mole) of thiourea, 50 ml. of toluene and 17 ml. of glacial acetic acid was stirred and heated at reflux for 3 hours. A Dean-Stark trap was used to collect water. The mixture was stirred for 16 hours at room temperature then concentrated at reduced pressure. The viscous residue was treated with 10% aqueous sodium hydroxide and extracted four times with methylene chloride. The extracts were combined, washed with brine, dried (MgSO$_4$), filtered and concentrated at reduced pressure giving 2.25 g. of dark oily racemic 2-amino-7-oxa-3-thia-1-azaspiro[5.6]dodec-1-ene.

IR: $\nu_{max}^{film}$ 3300, 3400, 1620, 1580 cm.$^{-1}$.

EXAMPLE 43

A solution of 1.1 g. (5.5 mmoles) of the crude aminothiazine prepared as in Example 42 in 10 ml. of pyridine was treated dropwise with 0.55 ml. of benzoyl chloride. The mixture was stirred for 3 hours at room temperature then treated with excess saturated sodium bicarbonate solution and extracted three times with ether. The ether extracts were combined, washed with brine, dried (MgSO$_4$), filtered and concentrated at reduced pressure giving 1.6 g. of oily racemic 2-benzamido-7-oxa-3-thia-1-azaspiro[5.6]dodec-1-ene.

This material was chromatographed on 85 g. of silica gel. Elution with 19:1 benzene:ether afforded 0.45 g. of product.

UV: $\lambda_{max.}^{EtOH}$ 237 m$\mu$ ($\epsilon$ 11720), 285 (15750), $\lambda_{max.}^{0.1 NH C}$ 258 m$\mu$ ($\epsilon$ 17130).
MS: m/e 304 (M+), 276 (M–28), 158, 125, 105 (base).

EXAMPLE 44

Racemic 2-p-fluorobenzamido-7-oxa-3-thia-1-azaspiro-[5,4]dec-1-ene hydrochloride was prepared from 7-oxa-3-thia-1-azaspiro[5.4]dec-1-ene and p-fluorobenzoylchloride in pyridine followed by treatment of the oily product with hydrogen chloride. Off-white solid, M.P. 193–194° (crystallized from methanol).

UV: $\lambda_{max.}^{EtOH}$ 247 m$\mu$ ($\epsilon$ 11650), 290 (24400).
IR: $\nu_{max.}^{CHCl_3}$ 2250–3250, 1685, 1575, 1555 cm.$^{-1}$.
NMR: $\delta_{TMS}^{DMSO-TFA}$ 8.30, 7.30, 4.10, 3.35, 2.35 p.p.m.

*Analysis.*—Calcd. for $C_{14}H_{15}FN_2O_2S \cdot HCl$ (percent): C, 50.83; H, 4.88; N, 8.47; S, 9.69. Found (percent): C, 50.82; H, 4.96; N, 8.38; S, 9.74.

EXAMPLE 45

The following compounds were prepared from racemic 2 - amino-7-oxa-3-thia-1-azaspiro[5.4]dec-1-ene using the procedure (of either Example 20, 22, 24 or 26) described for the spirothiazinepyran series:

Racemic 2-acetamido-7-oxa-3-thia-1-azaspiro[5.4]dec-1-ene.
Racemic 2-benzamido-7-oxa-3-thia-1-azaspiro[5.4]dec-1-ene.
Racemic 2-p-pbromobenzamido-7-oxa-3-thia-1-azaspiro[5.4]dec-1-ene.
Racemic 2-p-methoxybenzamido-7-oxa-3-thia-1-azaspiro[5.4]dec-1-ene.
Racemic 2-o-fluorobenzamido-7-oxa-3-thia-1-aza spiro[5.4]dec-1-ene.
Racemic 2-p-chlorobenzamido-7-oxa-3-thia-1-azaspiro[5.4]dec-1-ene.
Racemic 2-(1-adamantanylcarboxamido)-7-oxa-3-thia-1-azaspiro[5.4]dec-1-one.
Racemic 2-cinnamamido-7-oxa-3-thia-1-azaspiro[5.4]dec-1-ene.
Racemic 2-ethoxyacetamido-7-oxa-3-thia-1-azaspiro[5.4]dec-1-ene.
Racemic 2-phenylacetamido-7-oxa-3-thia-1-azaspiro[5.4]dec-1-ene.
Racemic 2-(3-phenyl)ureido-7-oxa-3-thia-1-azaspiro[5.4]dec-1-ene.
Racemic 2-phthalimido-7-oxa-3-thia-1-azaspiro[5.4]dec-1-ene.
Racemic 2-benzylamino-7-oxa-3-thia-1-azaspiro[5.4]dec-1-ene.
Racemic 2-methylamino-7-oxa-3-thia-1-azaspiro[5.4]dec-1-ene.
Racemic 2-phenylamino-7-oxa-3-thia-1-azaspiro[5.4]dec-1-ene.
Racemic 2-(3-trifluoromethylbenzamido)-7-oxa-3-thia-1-azaspiro[5.4]dec-1-ene.
Racemic 2-m-fluorobenzamido-7-oxa-3-thia-1-azaspiro[5.4]dec-1-ene.
Racemic 2-o-chlorobenzamido-7-oxa-3-thia-1-azaspiro[5.4]dec-1-ene.
Racemic 2-(2,4,6-trimethylbenzamido)-7-oxa-3-thia-1-azaspiro[5.4]dec-1-ene.
Racemic 2-p-nitrobenzamido-7-oxa-3-thia-1-azaspiro[5,4]dec-1-ene.
Racemic 2-(3,4,5-trimethoxybenzamido)-7-oxa-3-thia-1-azaspiro[5.4]dec-1-ene.
Racemic 2-(3,4-dimethoxybenzamido)-7-oxa-3-thia-1-azaspiro[5.4]dec-1-ene.
Racemic 2-p-cyanobenzamido-7-oxa-3-thia-1-azaspiro-[5.4]dec-1-ene.
Racemic 2-p-n-butoxybenzamido-7-oxa-3-thia-1-azaspiro[5.4]dec-1-ene.
Racemic 2-p-methylbenzamido-7-oxa-3-thia-1-azaspiro-[5.4]dec-1-ene.
Racemic 2-(3-carbomethoxypropionamido)-7-oxa-3-thia-1-azaspiro[5.4]dec-1-ene.
Racemic 2-(2,6-dichlorobenzamido)-7-oxa-3-thia-1-azaspiro[5.4]dec-1-ene.
Racemic 2-o-methylbenzamido-7-oxa-3-thia-1-azaspiro-[5.4]dec-1-ene.
Racemic 2-(2-furoamido)-7-oxa-3-thia-1-azaspiro[5.4]-dec-1-ene.
Racemic 2-(2-thenoamido)-7-oxa-3-thia-1-azaspiro-[5.4]dec-1-ene.
Racemic 2-trimethylacetamido-7-oxa-3-thia-1-azaspiro-[5.4]dec-1-ene.
Racemic 2-(2,6-dimethoxybenzamido)-7-oxa-3-thia-1-azaspiro[5.4]dec-1-ene.
Racemic 2-(1-phenyl-1-cyclopentane carboxamido)-7-oxa-3-thia-1-azaspiro[5.4]dec-1-ene.
Racemic 2-(1-methyl-1-cyclohexane carboxamido)-7-oxa-3-thia-1-azaspiro[5.4]dec-1-ene.
Racemic 2-m-nitrobenzamido-7-oxa-3-thia-1-azaspiro-[5.4]dec-1-ene.
Racemic 2-(4-dimethylaminobenzamido)-7-oxa-3-thia-1-azaspiro[5.4]dec-1-ene.
Racemic 2-(1-naphthamido)-7-oxa-3-thia-1-azaspiro-[5.4]dec-1-ene.
Racemic 2-(2,4-dichlorobenzamido)-7-oxa-3-thia-1-azaspiro[5.4]dec-1-ene.
Racemic 2-(4-phenylbenzamido)-7-oxa-3-thia-1-azaspiro[5.4]dec-1-ene.
Racemic 2-nicotinamido-7-oxa-3-thia-1-azaspiro[5.4]dec-1-ene.

EXAMPLE 46

The following compounds were prepared from racemic 2-amino-7-oxa-3-thia-1-azaspiro[5.6]dodec-1-ene using the procedures (of either Examples 20, 22, 24, or 26) described for the spirothiazinepyran series:

Racemic 2-acetamido-7-oxa-3-thia-1-azaspiro[5.6]dodec-1-ene.
Racemic 2-p-fluorobenzamido-7-oxa-3-thia-1-azaspiro-[5.6]dodec-1-ene.
Racemic 2-p-bromobenzamido-7-oxa-3-thia-1-azaspiro-[5.6]dodec-1-ene.
Racemic 2-p-methoxybenzamido-7-oxa-3-thia-1-azaspiro-[5.6]dodec-1-ene.
Racemic 2-o-fluorobenzamido-7-oxa-3-thia-1azaspiro-[5.6]dodec-1-ene.
Racemic 2-p-chlorobenzamido-7-oxa-3-thia-1-azaspiro-[5.6]dodec-1-ene.
Racemic 2-(1-adamantanylcarboxamido)-7-oxa-3-thia-1-azaspiro[5.6]dodec-1-ene.
Racemic 2-cinnamamido-7-oxa-3-thia-1-azaspiro[5.6]-dodec-1-ene.
Racemic 2-ethoxyacetamido-7-oxa-3-thia-1-azaspiro-[5.6]dodec-1-ene.
Racemic 2-phenylacetamido-7-oxa-3-thia-1-azaspiro-[5.6]dodec-1-ene.
Racemic 2-(3-phenyl)ureido-7-oxa-3-thia-1-azaspiro-[5.6]dodec-1-ene.
Racemic 2-phthalimido-7-oxa-3-thia-1-azaspiro[5.6]-dodec-1-ene.
Racemic 2-benzylamino-7-oxa-3-thia-1-azaspiro[5.6]-dodec-1-ene.
Racemic 2-methylamino-7-oxa-3-thia-1-azaspiro[5.6]dodec-1-ene.
Racemic 2-phenylamino-7-oxa-3-thia-1-azaspiro[5.6]dodec-1-ene.
Racemic 2-(3-trifluoromethylbenzamido)-7-oxa-3-thia-1-azaspiro[5.6]dodec-1-ene.

Racemic 2-m-fluorobenzamido-7-oxa-3-thia-1-azaspiro-
  [5.6]dodec-1-ene.
Racemic 2-o-chlorobenzamido-7-oxa-3-thia-1-azaspiro-
  [5,6]dodec-1-ene.
Racemic 2-(2,4-6-trimethylbenzamido)-7-oxa-3-thia-1-
  azaspiro[5.6]dodec-1-ene.
Racemic 2-p-nitrobenzamido-7-oxa-3-thia-1-azaspiro-
  [5.6]dodec-1-ene.
Racemic 2-(3,4,5-trimethoxybenzamido)-7-oxa-3-thia-1-
  azaspiro[5.6]dodec-1-ene.
Racemic 2-(3,4-dimethoxybenzamido)-7-oxa-3-thia-1-
  azaspiro[5.6]dodec-1-ene.
Racemic 2-p-cyanobenzamido-7-oxa-3-thia-1-azaspiro-
  [5.6]dodec-1-ene.
Racemic 2-p-n-butoxybenzamido-7-oxa-3-thia-1-azaspiro-
  [5.6]dodec-1-ene.
Racemic 2-p-methylbenzamido-7-oxa-3-thia-1-azaspiro-
  [5.6]dodec-1-ene.
Racemic 2-(3-carbomethoxypropionamide)-7-oxa-3-thia-
  1-azaspiro[5.6]dodec-1-ene.
Racemic 2-(2,6-dichlorobenzamido)-7-oxa-3-thia-1-
  azaspiro[5.6]dodec-1-ene.
Racemic 2-o-methylbenzamido-7-oxa-3-thia-1-azaspiro-
  [5.6]dodec-1-ene.
Racemic 2-(2-furoamido)-7-oxa-3-thia-1-azaspiro[5.6]
  dodec-1-ene.
Racemic 2-(2-thenoamido)-7-oxa-3-thia-1-azaspiro[5.6]
  dodec-1-ene.
Racemic 2-trimethylacetamido-7-oxa-3-thia-1-azaspiro-
  [5.6]dodec-1-ene.
Racemic 2-(2,6-dimethoxybenzamido)-7-oxa-3-thia-1-
  azaspiro[5.6]dodec-1-ene.
Racemic 2-(1-phenyl-1-cyclopentane carboxamido)-7-
  oxa-3-thia-1-azaspiro[5.6]dodec-1-ene.
Racemic 2-(1-methyl-1-cyclohexane carboxamido)-7-oxa-
  3-thia-1-azaspiro[5.6]dodec-1-ene.
Racemic 2-m-nitrobenzamido-7-oxa-3-thia-1-azaspiro-
  [5.6]dodec-1-ene.
Racemic 2-(4-dimethylaminobenzamido)-7-oxa-3-thia-1-
  azaspiro[5.6]dodec-1-ene.
Racemic 2-(1-naphthamido)-7-oxa-3-thia-1-azaspiro-
  [5.6]dodec-1-ene.
Racemic 2-(2,4-dichlorobenzamido)-7-oxa-3-thia-1-
  azaspiro[5.6]dodec-1-ene.
Racemic 2-(4-phenylbenzamido)-7-oxa-3-thia-1-
  azaspiro[5.6]dodec-1-ene.
Racemic 2-nicotinamido-7-oxa-3-thia-1-azaspiro[5.6]
  dodec-1-ene.

EXAMPLE 47

The following compounds were prepared from racemic 2-amino-7-oxa-3-thia-1-azaspiro[5.5]undec-1-ene according to the procedure of either Example 20 or Example 22:

Racemic 2-(2,6-dimethoxybenzamido)-7-oxa-3-thia-1-
  azaspiro[5.5]undec-1-ene (acid chloride method)

Colorless solid, M.P. 187.5–188.5° (recrystallized from ethanol).

UV: $\lambda_{max.}^{EtOH}$ 272 mμ (ε 16900); $\lambda_{max.}^{0.1 N HCl}$ 222 mμ (ε 15020), 251 (13600), $\lambda_{sh}^{0.1 N HCl}$ 285 (6400).
IR: $\nu_{max.}^{CHCl_3}$ 3400, 3100–3400, 1695, 1600, 1580, 1550 cm.$^{-1}$.
NMR: $\delta_{TMS}^{CDCl_3}$ 7.17, 6.50, 3.80, 2.77, 1.70 p.p.m.
MS: m/e 350 (M+), 322 (m−28), 165 (base), 144, 111.

Analysis.—Calcd. for $C_{17}H_{22}N_2O_4S$ (percent): C, 58.27; H, 6.33; N, 7.99; S, 9.15. Found (percent): C, 58.39; H, 6.44; N, 7.72; S, 9.22.

Racemic 2-(1-phenyl-1-cyclopentanecarboxamido)-7-
  oxa-3-thia-1-azaspiro[5.5]undec-1-ene (carbonyldi-
  imidazole method)

Colorless solid, M.P. 114–115° (recrystallized from ethanol).

UV: $\lambda_{max.}^{EtOH}$ 235 mμ (ε 8460), 273 (18620); $\lambda_{max.}^{0.1 N HCl}$ 215mμ (ε 13300), 228 (13480), 244 (13900).
IR: $\nu_{max.}^{KBr}$ 3100–3400, 1585, 1550 cm.$^{-1}$.
NMR: $\delta_{TMS}^{CDCl_3}$ 7.34, 3.66, 2.70, 1.69 p.p.m.
MS: m/e 358 (M+), 330 (M−28), 213, 111 (base), 91, 55.

Analysis.—Calcd. for $C_{20}H_{26}N_2O_2S$ (percent): C, 67.01; H, 7.31; N, 7.81; S, 8.94. Found (percent): C, 66.85; H, 7.23; N, 7.79; S, 8.94.

Racemic 2-(1-methyl-1-cyclohexane carboxamido)-7-
  oxa-3-thia-1-azaspiro[5.5]undec-1-ene (carbonyldi-
  imidazole method)

Colorless solid M.P. 103–104° (recrystallized from ethanol).

UV: $\lambda_{max.}^{EtOH}$ 236 mμ (ε 6820), 269 (17800); $\lambda_{max.}^{0.1 N HCl}$ 228 mμ (ε 13800), 247 (11450).
IR: $\nu_{max.}^{KBr}$ 3100–3400, 1590, 1560 cm.$^{-1}$.
NMR: $\delta_{TMS}^{CDCl_3}$ 3.74, 3.47, 2.173, 1.13, 0.90–2.40 p.p.m.
MS: m/e 310 (M+), 282 (M−28), 144, 111 (base), 55, 41.

Analysis.—Calcd. for $C_{16}H_{26}N_2O_2S$ (percent): C, 61.90; H, 8.44; N, 9.02; S, 10.33. Found (percent): C, 62.22; H, 8.49; N, 9.03; S, 10.23.

EXAMPLE 48

A solution of 2.6 g. (0.0125 mole) of 2-(2-chloroethyl)-2-(4-hydroxybutyl)-1,3-dioxolane, 0.95 g. (0.0125 mole) of thiourea, 0.4 ml. of water and 50 ml. of glacial acetic acid was stirred and heated under reflux for five hours then concentrated at reduced pressure. The residue was treated with ether and washed twice with two 20 ml. portions of 1.5 N aqueous sulfuric acid. The acid washes were combined and back extracted once with ether. The ether solutions were discarded.

The acid solution was made alkaline with 10% aqueous sodium hydroxide solution, saturated with sodium chloride and extracted three times with methylene chloride. The combined methylene chloride extracts were dried over anhydrous magnesium sulfate, filtered and concentrated at reduced pressure giving 1.65 g. of yellow crystalline racemic 2-amino-7-oxa-3-thia-1-azaspiro[5.5] undec-1-ene.

This material was dissolved in hot ethanol and treated with 1 g. of maleic acid. Crystallization gave 1.75 g. of colorless maleate salt M.P. 161–163°.

EXAMPLE 49

A mixture of 10.1 g. of racemic 2-p-fluorobenzamido-7-oxa-3-thia-1-azaspiro[5.5]undec-1-ene, 7.6 g. of d-(+)-camphorsulfonic acid and 250 ml. of ethanol was heated until all the solids had dissolved then concentrated to a volume of approximately 70 ml. at reduced pressure. After standing at room temperature for two hours and at 0° for 16 hours the solid was filtered. washed with ethanol and dried giving 8.9 g. of colorless solid, M.P. 149.5–151°. Two recrystallizations from ethanol gave pure (+)-2-p-fluorobenzamido-7-oxa-3-thia-1-azaspiro-[5.5]undec-1-ene di-(+)-camphorsulfonic acid salt, M.P. 149.5–151°; [α]$_D$ −22.61° (c.=0.9862 in CHCl$_3$).

Analysis.—Calcd. for $C_{15}H_{17}FN_2O_2S \cdot C_{10}H_{16}O_4S$ (percent): C, 55.54; H, 6.15; N, 5.18; S, 11.86. Found (percent): C, 55.66; H, 6.30; N, 5.19; S, 11.93.

EXAMPLE 50

A 0.3 g. sample of the salt prepared in Example 49 was shaken with saturated aqueous sodium bicarbonate solution and extracted with methylene chloride. After washing with brine and drying, the methylene chloride extract was concentrated at reduced pressure giving 0.169.

g. of colorless (+)-2-p-fluorobenzamido-7-oxa-3-thia-1-azaspiro[5.5]undec-1-ene, M.P. 108.5–109.5°;

$[\alpha]_D +36.71°$ (c.=0.9780 in CHCl$_3$). The spectral properties of this material were essentially identical to those of the racemic form.

Analysis.—Calcd. for C$_{15}$H$_{17}$FN$_2$O$_2$S (percent): C, 58.43; H, 5.56; N, 9.08; S, 10.40. Found (percent): C, 58.58; H, 5.69; N, 9.14; S, 10.27.

EXAMPLE 51

A mixture of 8.0 g. of racemic 2-p-fluorobenzamido-7-oxa-3-thia-1-azaspiro[5.5]undec-1-ene, 6.2 g. of 1-(−)-camphorsulfonic acid and 100 ml. of ethanol was heated until all the solids had dissolved then concentrated at reduced pressure. The residue was recrystallized from approximately 45 ml. of ethanol. This gave 9.5 g. of colorless solid, M.P. 148.5–150°. Another recrystallization from ethanol (30 ml.) gave 7.2 g. of (−)-2-p-fluorobenzamido-7-oxa-3-thia-1-azaspiro[5.5]undec - 1 - ene 1-(−) - camphorsulfonic acid salt, M.P. 148.5–150°; $[\alpha]_D +19.57°$ (c.=1.017 in CHCl$_3$).

Analysis.—Calcd. for C$_{15}$H$_{17}$FN$_2$O$_2$S·C$_{10}$H$_{16}$O$_4$S (percent): C, 55.54; H, 6.15; N, 5.18; S, 11.86. Found (percent): C, 55.53; H, 6.23; N, 5.15; S, 11.71.

EXAMPLE 52

A 6.4 g. sample of the salt prepared in Example 51 was shaken with excess aqueous saturated sodium bicarbonate solution and the mixture was extracted three times with methylene chloride. The methylene chloride extracts were combined, washed with brine, dried, filtered and concentrated at reduced pressure giving 3.45 g. of colorless (−)-2-p-fluorobenzamido-7-oxa-3-thia - 1 - azaspiro-[5.5]undec - 1 - ene, M.P. 109–110°; $[\alpha]_D -36.76°$ (c.=1.020 in CHCl$_3$). The spectral properties of this material were essentially identical to those of the racemic form and the (+)-enantiomer.

Analysis.—Calcd. for C$_5$H$_{17}$FN$_2$O$_2$S (percent): C, 58.43; H, 5.56; N, 9.08; S, 10.40. Found (percent): C, 58.23; H, 5.64; N, 9.10; S, 10.14.

EXAMPLE 53

A solution of 0.55 g. (0.0033 mole) of 7-chloroheptan-5-on-1-ol and 0.258 g. of thiourea in 25 ml. of acetonitrile was stirred and heated at reflux for 18 hours. The solution was cooled to 0° and the resulting precipitate was filtered giving 0.33 g. of colorless racemic 2-amino-7-oxa-3-thia-1-azaspiro[5.5]-unde-1-ene hydrochloride, M.P. 206–209°.

Neutralization with aqueous sodium hydroxide gave the free base, M.P. 135–139°.

EXAMPLE 54

A mixture of 42.5 g. (0.237 mole) of methyl 8-chloro-6 - oxooctanoate, 26.5 ml. of ethylene glycol, 0.4 g. of p-toluene-sulfonic acid monohydrate and 490 ml. of benzene was stirred and heated at reflux for five hours using a Dean-Stark trap to remove water. After cooling the reaction mixture was washed with saturated aqueous sodium bicarbonate solution. The aqueous phase was back extracted three times with ether. The organic solutions were combined, washed with brine, dried over anhydrous magnesium sulfate then filtered and concentrated at reduced pressure giving 49.7 g. of red, oily methyl 8-chloro-6-oxooctanoate ethylene ketal.

IR: $\nu_{max}^{film}$ 1745 cm.$^{-1}$.

EXAMPLE 55

A slurry of 4.65 g. of lithium aluminum hydride in 200 ml. of dry ether was stirred with ice-bath cooling while a solution of 25 g. (0.10 mole) of the ester from the preceding example in 50 ml. of dry ether was added dropwise over 30 minutes. The mixture was stirred at 0–5° for 30 minutes then at room temperature for 2.5 hours. After cautious decomposition by the dropwise addition of 9.4 ml. of water an 7.4 ml. of 10% aqueous sodium hydroxide with ice-bath cooling, the mixture was stirred at room temperature for 1.5 hours. The solids were filtered with suction and washed well with ether. The filtrate and washes were combined and concentrated at reduced pressure giving 17.7 g. of yellow, oily 2-(2-chloroethyl)-2-(5-hydroxypentyl)-1,3-dioxolane.

IR: $\nu_{max}^{film}$ 3400 cm.$^{-1}$.

EXAMPLE 56

A solution of 2 g. of the ketal from the preceding example in 16 ml. of acetone, 16 ml. of water and 5.4 ml. of 3 N aqueous sulfuric acid was stirred at room temperature for three hours. After dilution with saturated brine, the mixture was extracted four times with ether. The ether extracts were combined and dried over anhydrous magnesium sulfate then filtered and concentrated at reduced pressure giving 1.15 g. of 8-chlorooctan-6-on-1-ol.

IR: $\nu_{max}^{film}$ 3400, 1715 cm.$^{-1}$.

EXAMPLE 57

A solution of the ketone from the preceding example and 0.486 g. of thiourea in 50 ml. of acetonitrile was stirred and heated at reflux for 17.5 hours. The solution was concentrated at reduced pressure and the residue was triturated under acetone. The resulting solid was filtered to give 0.38 g. of pale-yellow racemic 2 - amino - 7 - oxa-3 - thia - 1 - azaspioro[5.6]dodec - 1 - ene hydrochloride. Recrystallization from methanol-ether gave colorless solid, M.P. 159–160°.

Analysis.—Calcd. for C$_9$H$_{16}$N$_2$OS·HCl (percent): C, 45.66; H, 7.24; N, 11.83; S, 13.54. Found (percent): C, 45.80; H, 7.37; N, 11.84; S, 13.50.

EXAMPLE 58

A solution of 1.25 g. (5.84 mmoles) of the isomeric mixture of 2 - amino - 8 - ethyl-7-oxa-3-thia-1-azaspiro-[5.5] undec-1-ene, prepared as in Example 18, 0.75 g. (6.7 mmoles) of 2-methyl-1,3-cyclopentandione, 0.25 g. of p-toluenesulfonic acid monohydrate, 10 ml. of water and 20 ml. of dioxane was stirred and heated at reflux, under nitrogen, for 99 hours. After cooling, the mixture was poured into dilute aqueous sulfuric acid and extracted three times with ether. The ether extracts were combined, washed with saturated aqueous sodium bicarbonate solution, dried, filtered, and concentrated at reduced pressure, giving 0.685 g. of red oil.

This material was stirred and heated at reflux, under nitrogen, for 0.5 hour, in 10 ml. of benzene containing 25 mg. of p-toluene- sulfonic acid monohydrate. A Dean-Stark trap was used to collect water. The solution was cooled, diluted with ether and washed once with aqueous sodium bicarbonate solution then dried, filtered and concentrated at reduced pressure giving 0.558 g. of orange solid.

This material was chromatographed on 25 g. of silica gel. Elution with 19:1 benzene:ether afforded 0.454 g. of racemic 3 - ethyl - 6a - methyl - 1,2,3,5,6,6a-hexahydrocyclopenta[f][1]benzopyran-7(8H)-one. Recrystallization from hexane-ether gave orange crystals, M.P. 101–103.5°.

UV: $\lambda_{max}^{EtOH}$ 254 m$\mu$ ($\epsilon$=18200).
IR: $\nu_{max}^{CHCl_3}$ 1750, 1645 cm.$^{-1}$.

The aqueous sulfuric acid solution from the above workup was made alkaline with potassium carbonate, saturated with salt and extracted three times with methylene chloride. The organic extracts were combined, dried, filtered and concentrated at reduced pressure. Solvent removal gave recovered starting aminothiazine mixture.

EXAMPLE 59

A solution of 1.25 g. (6.26 mmoles) of the isomeric mixture of 2 - amino - 8 - methyl-7-oxa-3-thia-1-azaspiro[5.5]undec-1-ene prepared as in Example 10, 0.82 g. (7.3 mmoles) of 2 - methyl - 1,3 - cyclopentandione, 0.28 g. of p-toluenesulfonic acid monohydrate, 10 ml. of water and 20 ml. of dioxane was stirred and heated at reflux, under nitrogen for seven days. Work-up as in the previous experiment gave 0.783 g. of orange semi-solid.

This material was treated with p-toluenesulfonic acid (25 mg.) in 10 ml. of benzene as in the preceding experiment to give 641 mg. of orange solid. Chromatography over 30 g. of silica gel afforded 459 mg. of orange, solid, racemic 3,6a-dimethyl-1,2,3,5,6,6a-hexahydrocyclopenta[f][1]benzopyran-7(8H)-one.

Recrystallization from benzene-hexane gave orange, solid, M.P. 145–148°.

UV: $\lambda_{max.}^{EtOH}$ 254 m$\mu$ ($\epsilon$ 17600).
IR: $\nu_{max.}^{CHCl_3}$ 1740, 1640 cm.$^{-1}$.

EXAMPLE 60

Parenteral formulation 2-amino-7-oxa-3-thia-1-azaspiro[5.5]undec-1-ene was prepared in duplex ampuls, one containing the dry drug and the other containing Water for Injection, U.S.P.

| | Dry fill ampul 5 cc. mg. |
|---|---|
| 2-amino-7-oxa-3-thia-1-azaspiro[5.5]undec-1-ene | 10 |

A parenteral grade of the drug, fiber free, was filled into the ampul using a Diehl Mater electric filler or other suitable type filler. The ampuls were sealed and sterilized at 255° F. for two hours.

Immediately before use the powder was solubilized with the following solution:

Water for injection, U.S.P.—5 cc.

EXAMPLE 61

Parenteral formuation

| Drug: | Per ml., mg. |
|---|---|
| Racemic 2 - phthalimido-7-oxa-3-thia-1-azaspiro[5.5]undec-1-ene (micronized) | |
| Racemic 2-cinnamamido-7-oxa-3-thia-1-aza-1-azaspiro[5.5]undec-1-ene (micronized) | 10.0 |
| or | |
| Racemic 2-cinnamamido-7-oxa-2-thia-1-azaspiro[5.5]undec-1-ene hydrochloride | |
| Sodium chloride | 9.0 |
| Sodium carboxymethyl cellulose, #7L2 | 2.5 |
| Benzyl alcohol | 9.0 |
| Sodium acetate 3H$_2$O | 0.2 |
| Acetic acid glacial | 0.3 |
| Water for injection qs. add 1.0 ml. | |

(1) The sodium chloride benzyl alcohol, sodium acetate and acetic acid were added in that order in part of the Water for injection with constant stirring.

(2) The sodium carboxymethyl cellulose was added with constant stirring until completely hydrated.

(3) The micronized drug was added with stirring to obtain a homogeneous suspension. The suspension was then brought to volume with Water for injection, filled into 2 cc. flint ampuls, sealed and sterilized at 212° F. for 30 minutes.

EXAMPLE 62

Tablet formulation

| Drug: | Per tablet, mg. |
|---|---|
| 2-amino-7-oxa-3-thia - 1 - azaspiro[5.5]undec-1-ene maleate | |
| Racemic 2-phthalimido-7-oxa-3-thia - 1 - azaspiro[5.5]undec-1-ene | |
| Racemic 2-p-fluorobenzamido-7-oxa-3-thia-1-azaspiro[5.5]undec-1-ene | 100 |
| or | |
| Racemic 2-cinnamamido-7-oxa-3-thia-1-azaspiro[5.5]undec-1-ene hydrochloride | |
| Lactose, U.S.P. | 202 |
| Corn starch, U.S.P. | 80 |
| Amijel BO11[1] | 20 |
| Calcium stearate | 8 |
| Total weight | 410 |

[1] A prehydrolyzed food grade crn starch. Any similar prehydrolyzed corn starch may be used. Purchased from: Corn Products Company, 10 East 56th Street, New York, N.Y.

Procedure (1) The drug, lactose, corn, starch and amijel BO11 were blended in a suitable mixer.

(2) The mixture was granulated to a heavy paste with water and the moist mass was passed through a #12 screen. It was then dried overnight at 110° F.

(3) The dried granules were passed through a #16 screen and transferred to a suitable mixer. The calcium stearate was added and mixed until uniform.

(4) The mixture was compressed at a tablet weight of 410 mg. using tablet punches having a diameter of approximately ⅜" (Tablets may be either flat or biconvex and may be scored if desired.)

EXAMPLE 63

Capsule formulation

| Drug: | Per capsule, mg. |
|---|---|
| 2-amino-7-oxa-3-thia - 1 - azaspiro[5.5]undec-1-ene maleate | |
| Racemic 2 - phthalimido-7-oxa-3-thia-1-azaspiro[5.5]undec-1-ene | |
| Racemic 2-p-fluorobenzamido-7-oxa-3-thia-1-azaspiro[5.5]undec-1-ene | 10 |
| or | |
| Racemic 2-cinnamamido-7-oxa-3-thia-1-azaspiro[5.5]undec-1-ene hydrochloride | |
| Lactose, U.S.P. | 165 |
| Corn starch, U.S.P. | 30 |
| Talc, U.S.P. | 5 |
| Total weight | 210 |

Procedure (1) The drug, lactose and corn starch were mixed in a suitable mixer.

(2) The mixture was further blended by passing through a Fitzpatrick Comminuting Machine with a #1A screen with knives forward.

(3) The blended powder was returned to the mixer, the talc added and blended thoroughly.

(4) The mixture was filled into #4 hard shell gelatin capsules on a Parke Davis capsulating machine. (Any similar type capsulating machine may be used.)

EXAMPLE 64

Table formulation

| Drug: | Per tablet, mg. |
|---|---|
| 2-amino-7-oxa-3-thia-1-azaspiro[5.5]undec-1-ene maleate | |
| Racemic 2-phthalimido-7-oxa-3-thia-1-azaspiro[5.5]undec-1-ene | |
| Racemic 2-p-fluorobenzamido-7-3-thia-1-azaspiro[5.5]undec-1-ene | 25 |
| or | |
| Racemic 2-cinnamamido-7-oxa-3-thia-1-azaspiro[5.5]undec-1-ene hydrochloride | |
| Dicalcium phosphate dihydrate, unmilled | 175 |
| Corn starch | 24 |
| Magnesium stearate | 1 |
| Total weight | 225 |

Procedure (1) The drug and corn starch were mixed together and passed through an #00 screen in Model "J" Fitzmill with hammers forward.

(2) This premix was then mixed with dicalcium phosphate and on-ehalf of the magnesium stearate, passed through a #1A screen in Model "J" Fitzmill with knives forward, and slugged.

(3) The slugs were passed through a #2A plate in a Model "D" Fitzmill at slow speed with knives forward, and the remaining magnesium stearate was added.

(4) The mixture was mixed and compressed.

EXAMPLE 65

Capsule formulation

| Drug: | Per capsule, mg. |
|---|---|
| 2-amino-7-oxa-3-thia-1-azapiro[5.5]undec-1-ene maleate | |
| Racemic 2-phthalimido-7-oxa-3-thia-1-azaspiro[5.5]undec-1-ene | |
| Racemic 2-p-fluorobenzamido-7-oxa-3-thia-1-azaspiro[5.5]undec-1-ene | 50 |
| or | |
| Racemic 2-cinnamamido-7-oxa-3-thia-1-azaspiro[5.5]udec-1-ene hydrochloride | |
| Lactose, U.S.P. | 125 |
| Corn starch, U.S.P. | 30 |
| Talc, U.S.P. | 5 |
| Total weight | 210 |

Procedure (1) The drug was mixed with lactose and corn starch in a suitable mixer.

(2) The mixture was further blended by passing through a Fitzpatrich Comminuting Machine with a #1A screen with knives forward.

(3) The blended powder was returned to the mixer, the talc added and blended thoroughly.

(4) The mixture was filled into #4 hard shell gelatin capsules on a Parke Davis capsulating machine.

EXAMPLE 66

Tablet Formulation

| Drug: | Per tablet, mg. |
|---|---|
| 2-amino-7-oxa-3-thia-1-azaspiro[5.5]undec-1-ene maleate | |
| Racemic 2-phthalimido-7-oxa-3-thia-1-azaspiro[5.5]undec-1-ene | |
| Racemic 2-p-fluorobenzamido-7-oxa-3-thia-1-azaspiro[5.5]undec-1-ene | 200 |
| or | |
| Racemic 2-cinnamamido-7-oxa-3-thia-1-azaspiro[5.5]undec-1-ene hydrochloride | |
| Dicalcium phosphate dihydrate, unmilled | 235 |
| Corn starch | 70 |
| FD&C Yellow #5-Aluminum Lake 25% | 2 |
| Durkee 117 | 25 |
| Calcium stearate | 3 |
| Total weight | 535 |

Procedure (1) All the ingredients were mixed thoroughly and Fitzed (Model D) using a #1A screen, medium speed.

(2) The mixture was remixed and slugged.

(3) The slugs were screened on an Oscillator through a #14 mesh screen and compressed on an "E" machine.

EXAMPLE 67

Suppository formulation

| Drug: | Per 1.3 gm. suppository, gm. |
|---|---|
| 2-amino-7-oxa-3-thia-1-azaspiro[5.5]undec-1-ene maleate | |
| Racemic 2-phthalimido-7-oxa-3-thia-1-azaspiro[5.5]undec-1-ene | |
| Racemic 2-p-fluorobenzamido-7-oxa-3-thia-1-azaspiro[5.5]undec-1-ene | 0.025 |
| or | |
| Racemic 2-cinnamamido-7-oxa-3-thia-1-azaspiro[5.5]undec-1-ene hydrochloride | |
| Wecobee M [1] | 1.230 |
| Carnauba wax | 0.045 |

[1] E. F. Drew Company, 522 Fifth Avenue, New York, N.Y.

Procedure (1) The Wecobee M and the carnauba wax were melted in a suitable size glass lined container (stainless steel may also be used), mixed well and cooled to 45° C.

(2) The drug which had been reduced to a fine powder with no lumps, was added and stirred until completely and uniformly dispersed.

(3) The mixture was poured into suppository molds to yield suppositories having an individual weight of 1.3 gms.

(4) The suppositories were cooled and removed from molds. They were individually wrapped in wax paper for packaging. (Foil may also be used.)

EXAMPLE 68

The mixture of isomers of racemic 2-amino-8-phenyl-7-oxa-3-thia-1-azaspiro[5.5]undec-1-ene prepared as in Example 7 was treated with p-bromobenzoyl chloride in the usual fashion. After chromatography, the 2-isomers of racemic 2-p-bromobenzamido-8-phenyl-7-oxa-3-thia-1-azaspiro[5.5]undec-1-ene were isolated:

Isomer 1—Colorless solid, M.P. 126.5–127.5°

*Analysis.*—Calcd. for $C_{21}H_{21}BrN_2O_2S$ (percent): C, 56.63; H, 4.75; N, 6.29; S, 7.20. Found (percent): C, 56.62; H, 4.87; N, 6.12; S, 7.32 and Isomer 2—Colorless solid, M.P. 157–157.5°

*Analysis.*—Calcd. for $C_{21}H_{21}BrN_2O_2S$ (percent): C, 56.63; H, 4.75; N, 6.29; S, 7.20. Found (percent): C, 56.48; H, 4.70; N, 6.15; S, 7.25

We claim:

1. A compound of the formula

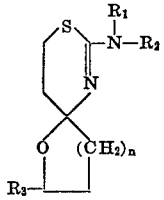

wherein $R_1$ taken independently is hydrogen, lower alkyl, lower alkenyl, aryl lower alkyl, aryl, lower alkanoyl, or benzoyl; $R_2$ taken independently is hydrogen, lower alkyl, lower alkenyl, aryl, aryl lower alkyl, or a group of the formula

where $R_4$ is lower alkyl, phenyl, phenyl substituted with one to three lower alkyl, lower alkoxy or halogen groups, or one trifluoromethyl, phenyl, nitro, cyano, hydroxy, amino, lower alkyl amino or di(lower alkyl) amino group, naphthyl, furyl, thienyl, pyridyl, cyclopentyl, cyclohexyl, cyclopentyl or cyclohexyl substituted with one lower alkyl or phenyl group, aryl lower alkyl, styryl or one of the groups $—(CH_2)_m—R_5$ and $—NH—R_6$ where $R_5$ is lower alkoxy or lower alkoxycarbonyl, $R_6$ is lower alkyl or phenyl and $m$ is an integer of from one to six with the proviso that $R_1$ and $R_2$ are not both hydrogen; $R_1$ and $R_2$ taken together are a group of one of the formulas

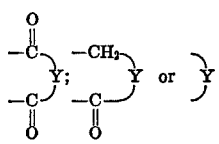

where Y is a lower alkylene group of from one to three carbons or ortho-phenylene; $R_3$ is hydrogen, lower alkyl, phenyl, 3,5-di(lower alkyl)isoxazol-4-yl-ethyl, 4,4-lower alkylenedioxy- or 4,4-phenylenedioxy-1-pentyl or 3-cyanopropyl; $n$ is a ninteger of from 1 to 3; aryl refers to carbocyclic aryl of from 6 to 10 carbon atoms; and the tautomers, enantiomers and acid addition salts thereof.

2. The compound of claim 1 wherein $R_3$ is hydrogen.
3. The compound of claim 1 wherein $n$ is 2.
4. The compound of claim 1 of the formula

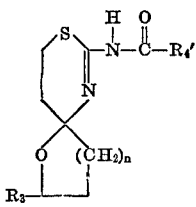

where $R_4'$ is lower alkyl, phenyl, phenyl substituted with one to three lower alkyl, lower alkoxy or halogen groups, or one trifluoromethyl, phenyl, nitro, cyano, hydroxy, amino lower alkly amino or di(lower alkyl) amino group, cyclopentyl, cyclohexyl, cyclopentyl or cyclohexyl substituted with one lower alkyl or phenyl group, naphthyl furyl, thienyl, pyridyl, aryl lower alkyl wherein aryl refers to carbocyclic aryl of from 6 to 10 carbon atoms, styryl or the group $—(CH_2)_m—R_5$ where $R_5$ is lower alkoxy or lower alkoxycarbonyl, and $R_3$, $m$ and $n$ are as above.

5. The compound of claim 4 wherein $R_4'$ is phenyl or phenyl substituted with one to three lower alkyl, lower alkoxy or halogen groups, or one trifluormethyl, phenyl, nitro cyano, hydroxy, amino, lower alkyl amino or di-(lower alkyl) amino group.

6. The compound of claim 5 wherein $R_4'$ is phenyl mono-substituted in the meta or para position with a substituent according to claim 5.

7. The compound of claim 6 which is 2-p-fluorobenzamido-7-oxo-3-thia-1-azaspiro[5.5]undec-1-ene.

8. The compound of claim 6 which is 2-p-methylbenzamido-7-oxa-3-thia-1-azaspiro[5.5]undec-1-ene.

9. The compound of claim 6 which is 2-p-cyanobenzamido-7-oxa-3-thia-1-azaspiro[5.5]undec-1-ene.

10. The compound of claim 6 which is 2-p-nitrobenzamido-7-oxa-3-thia-1-azaspiro[5.5]undec-1-ene.

11. The compound of claim 6 which is 2-m-fluorobenzamido-7-oxa-3-thia-1-azaspiro[5.5]undec-1-ene.

12. The compound of claim 1 which is 2-cinnamamido-7-oxa-3-thia-1-azaspiro[5.5]undec-1-ene.

13. The compound of claim 1 which is 2-phthalimido-7-oxa-3-thia-1-azaspiro[5.5]undec-1-ene.

14. The compound of claim 1 wherein $R_4$ is furyl, thienyl or pyridyl.

15. The compound of claim 1 wherein $R_4$ is a lower alkyl group.

16. The compound of claim 1 of the formula

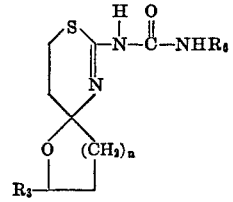

where $R_3$, $R_6$ and $n$ are as above.

17. The compound of claim 1 of the formula

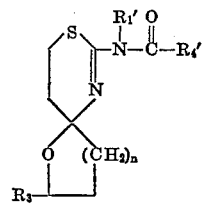

where $R_1'$ is lower alkyl, lower alkenyl, aryl lower alkyl wherein aryl refers to carbocyclic aryl of from 6 to 10 carbon atoms, lower alkanoyl or benzoyl and $R_3$, $R_4'$ and $n$ are as above.

18. The compound of claim 1 of the formula

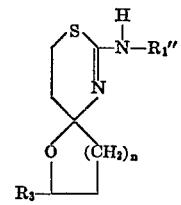

where $R_1''$ is lower alkyl, lower alkenyl, aryl or aryl lower alkyl wherein aryl refers to carbocyclic aryl of from 6 to 10 carbon atoms, and $R_3$ and $n$ are as above.

19. The compound of claim 1 of the formula

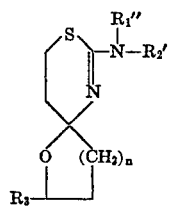

where $R_1''$ and $R_2'$ are each lower alkyl, lower alkenyl, aryl or aryl lower alkyl wherein aryl refers to carbocyclic aryl of from 6 to 10 carbon atoms, and $R_3$ and $n$ are as above.

20. A process for preparing greater than the theoretical amount of an acid addition salt of an optical antipode of one of the formulas

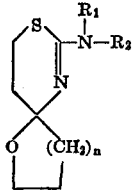

or

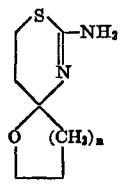

where $R_1$ taken independently is hydrogen, lower alkyl, lower alkenyl, aryl lower alkyl, aryl, lower alkanoyl or benzoyl; $R_2$ taken independently is hydrogen, lower alkyl, lower alkenyl, aryl, aryl lower alkyl, or a group of the formula

where $R_4$ is lower alkyl, phenyl, phenyl substituted with one to three lower alkyl, lower alkoxy or halogen groups, or one trifluoromethyl, phenyl, nitro, cyano, hydroxy, amino, lower alkyl amino or di(lower alkyl) amino group, furyl, thienyl, pyridyl, naphthyl, cyclopentyl, cyclohexyl, cyclopentyl or cyclohexyl substituted with one lower alkyl or phenyl group, aryl lower alkyl, styryl or one of the groups $-(CH_2)_m-R_5$ and $-NH-R_6$ where $R_5$ is lower alkoxy or lower alkoxycarbonyl, $R_6$ is lower alkyl or phenyl and $m$ is an integer of from one to six with the proviso that $R_1$ and $R_2$ are not both hydrogen; $R_1$ and $R_2$ taken together are a group of one of the formulas

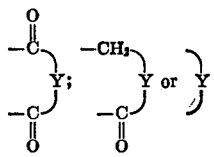

where Y is a lower alkylene group of from one to three carbons or ortha-phenylene; $n$ is an integer of from 1 to 3; aryl refers to carbocyclic aryl of from 6 to 10 carbon atoms; and the tautomers thereof, with the proviso that $R_1$ and $R_2$ taken independently or together do not contain a chiral center,
which comprises treating a racemic compound of one of the above formulas with an optically active acid selected from the group consisting of carboxylic acids and organic sulfonic acids.

21. The process of claim 20 wherein said strong chiral acid is an optical antipode of an organic sulfonic acid.

22. The process of claim 20 wherein said acid addition salt precipitates from the reaction medium.

23. The process of claim 20 wherein said acid addition salt is decomposed to afford an optically active amine of one of the above formulas.

24. A process for racemizing an optical antipode of one of the formulas

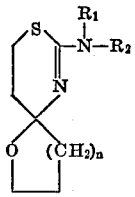

or

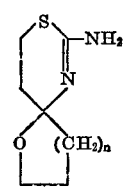

wherein $R_1$ taken independently is hydrogen, lower alkyl, lower alkenyl, aryl lower alkyl, aryl, lower alkanoyl or benzoyl; $R_2$ taken independently is hydrogen, lower alkyl, lower alkenyl, aryl, aryl lower alkyl, or a group of the formula

where $R_4$ is lower alkyl, phenyl, phenyl substituted with one to three lower alkyl, lower alkoxy or halogen groups, or one trifluoromethyl, phenyl, nitro, cyano, hydroxy, amino, lower alkyl amino or di(lower alkyl) amino group, furyl, thienyl, pyridyl, naphthyl, cyclopentyl, cyclohexyl, cyclopentyl or cyclohexyl substituted with one lower alkyl or phenyl group, aryl lower alkyl, styryl or one of the groups $-(CH_2)_m-R_5$ and $$-NH-R_6$$

where $R_5$ is lower alkoxy or lower alkoxycarbonyl, $R_6$ is lower alkyl or phenyl and $m$ is an integer of from one to six with the proviso that $R_1$ and $R_2$ are not both hydrogen; $R_1$ and $R_2$ taken together are a group of one of the formulas

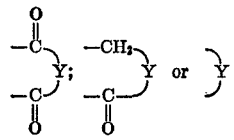

where Y is a lower alkylene group of from one to three carbons or ortho-phenylene; $n$ is an integer of from 1 to 3; aryl refers to carbocyclic aryl of from 6 to 10 carbon atoms; and the tautomers and acid addition salts thereof with the proviso that $R_1$ and $R_2$ taken independently or together do not certain a chiral center.
which comprises treating said optical antipode with a strong achiral acid selected from the group consisting of mineral acids and organic sulfonic acids.

References Cited
UNITED STATES PATENTS 3,661,902  5/1972  Nakanishi et al. _____ 260—243

JOHN M. FORD, Primary Examiner

U.S. Cl. X.R.

424—246; 260—584 B, 615 A

UNITED STATES PATENT OFFICE
CERTIFICATE OF CORRECTION

Patent No. 3,801,573    Dated April 2, 1974

Inventor(s) Noal Cohen

It is certified that error appears in the above-identified patent and that said Letters Patent are hereby corrected as shown below:

Column 41, line 66, "alkly" should be

-- alkyl --

Signed and sealed this 29th day of October 1974.

(SEAL)
Attest:

McCOY M. GIBSON JR.
Attesting Officer

C. MARSHALL DANN
Commissioner of Patents